United States Patent
Yamajo et al.

(10) Patent No.: US 10,432,847 B2
(45) Date of Patent: Oct. 1, 2019

(54) SIGNAL PROCESSING APPARATUS AND IMAGING APPARATUS

(71) Applicant: Sony Corporation, Tokyo (JP)

(72) Inventors: Hiroaki Yamajo, Kanagawa (JP); Masayuki Tachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/580,077

(22) PCT Filed: Feb. 17, 2017

(86) PCT No.: PCT/JP2017/005847
§ 371 (c)(1),
(2) Date: Dec. 6, 2017

(87) PCT Pub. No.: WO2017/179295
PCT Pub. Date: Oct. 19, 2017

(65) Prior Publication Data
US 2018/0302551 A1    Oct. 18, 2018

(30) Foreign Application Priority Data

Apr. 13, 2016 (JP) .................................. 2016-080132

(51) Int. Cl.
*H04N 5/232* (2006.01)
*H04N 5/225* (2006.01)
*H04N 9/04* (2006.01)

(52) U.S. Cl.
CPC ....... *H04N 5/23216* (2013.01); *H04N 5/2258* (2013.01); *H04N 5/23206* (2013.01);
(Continued)

(58) Field of Classification Search
CPC ............... H04N 5/23216; H04N 9/045; H04N 5/23241; H04N 5/2258; H04N 5/23206; H04N 5/23232
See application file for complete search history.

(56) References Cited

U.S. PATENT DOCUMENTS

| 10,007,972 B2* | 6/2018 | Choi .................... G06T 3/4053 |
| 2014/0132735 A1* | 5/2014 | Lee ...................... H04N 5/2258 348/47 |

(Continued)

FOREIGN PATENT DOCUMENTS

| EP | 2 940 658 A1 | 11/2015 |
| JP | 2003-134375 A | 5/2003 |

(Continued)

OTHER PUBLICATIONS

Written Opinion and English translation thereof dated May 9, 2017 in connection with International Application No. PCT/JP2017/005847.

(Continued)

*Primary Examiner* — Chia Wei A Chen
(74) *Attorney, Agent, or Firm* — Wolf, Greenfield & Sacks, P.C.

(57) ABSTRACT

A signal processing apparatus of one embodiment of the disclosure includes a composition unit that generates first composite imaging data, by adding together a low-frequency component of first imaging data, a high-frequency component of the first imaging data, and a high-frequency component of second imaging data. The first imaging data is imaging data of a relatively wide angle of view, out of two pieces of imaging data that differ in angle of view from each other. The second imaging data is imaging data of a relatively narrow angle of view, out of the two pieces of the imaging data.

10 Claims, 27 Drawing Sheets

(52) U.S. Cl.
CPC ..... *H04N 5/23232* (2013.01); *H04N 5/23241* (2013.01); *H04N 9/045* (2013.01)

(56) References Cited

U.S. PATENT DOCUMENTS

| | | | |
|---|---|---|---|
| 2015/0334283 A1* | 11/2015 | Vranceanu | G06T 5/003 |
| | | | 348/239 |
| 2015/0339805 A1 | 11/2015 | Ohba et al. | |
| 2016/0173793 A1* | 6/2016 | Mitsunaga | H04N 9/045 |
| | | | 348/229.1 |
| 2016/0366329 A1* | 12/2016 | Sasaki | G02B 7/365 |
| 2017/0161913 A1* | 6/2017 | Khazanov | H04N 5/23245 |
| 2017/0358067 A1* | 12/2017 | Jung | G06T 3/4061 |
| 2019/0065845 A1* | 2/2019 | Xu | G06F 21/32 |

FOREIGN PATENT DOCUMENTS

| | | |
|---|---|---|
| JP | 2004-297332 A | 10/2004 |
| JP | 2012-044443 A | 3/2012 |
| JP | 2014-127151 A | 7/2014 |

OTHER PUBLICATIONS

International Preliminary Report on Patentability and English translation thereof dated Oct. 25, 2018 in connection with International Application No. PCT/JP2017/005847.

International Search Report and English translation thereof dated May 9, 2017 in connection with International Application No. PCT/JP2017/005847.

\* cited by examiner

[ FIG. 1 ]
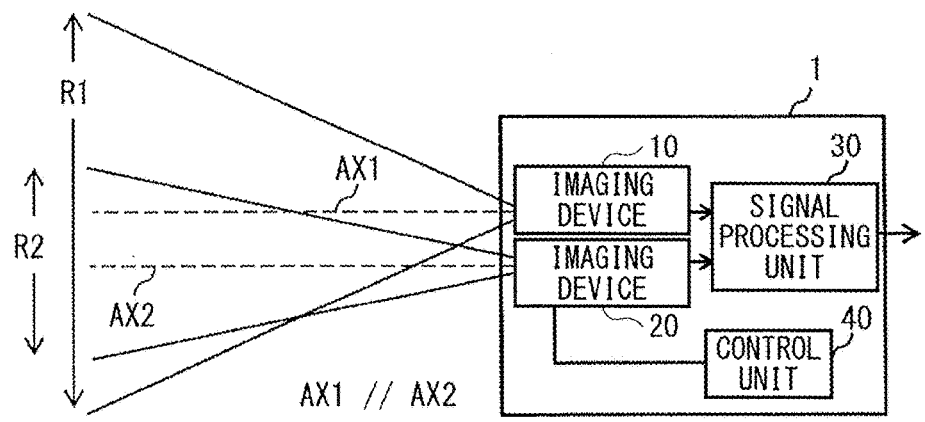
[ FIG. 2 ]
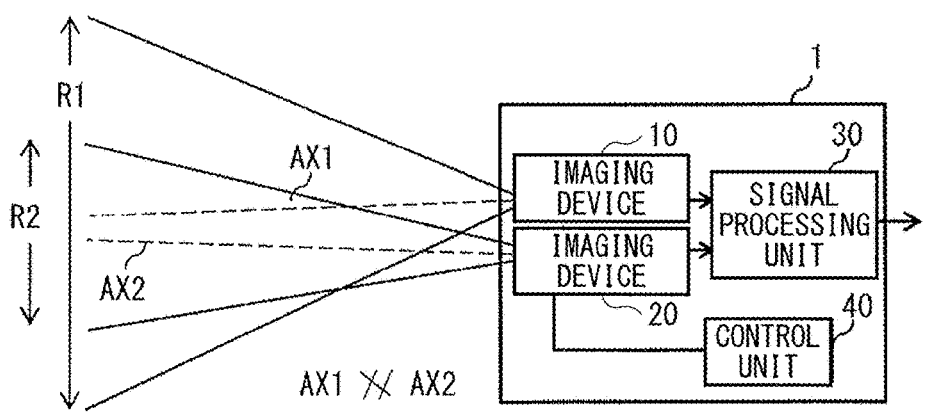

[ FIG. 3 ]
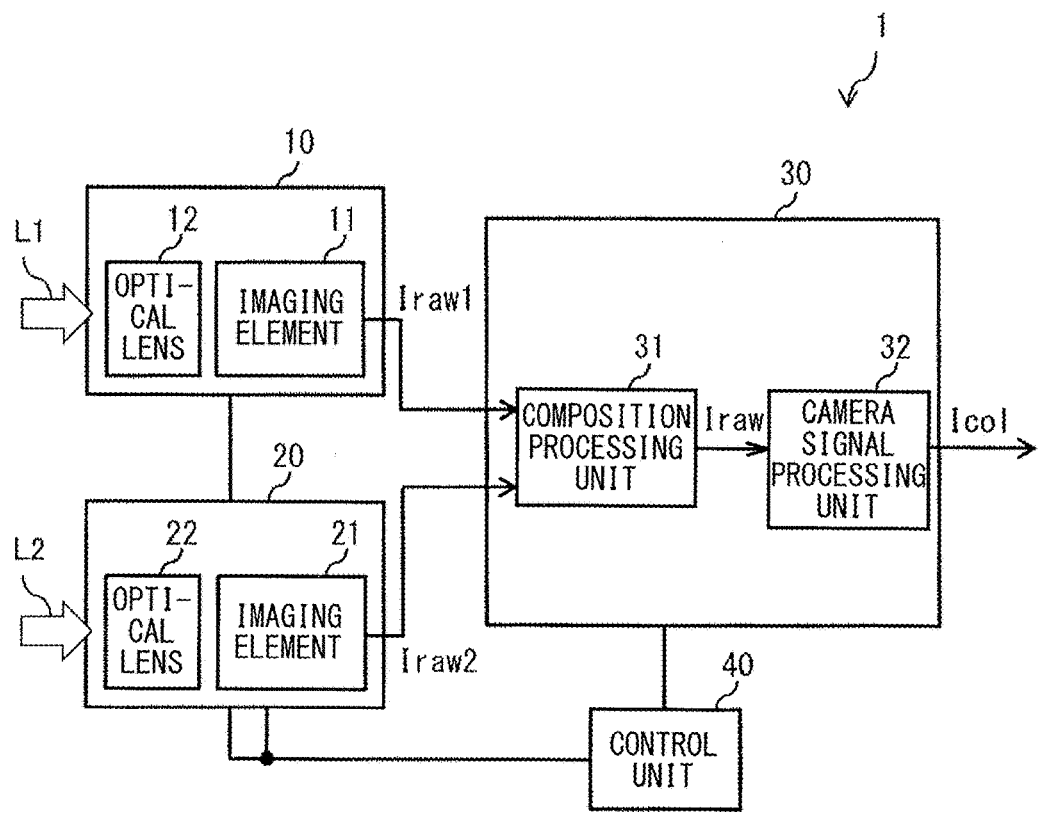
[ FIG. 4 ]
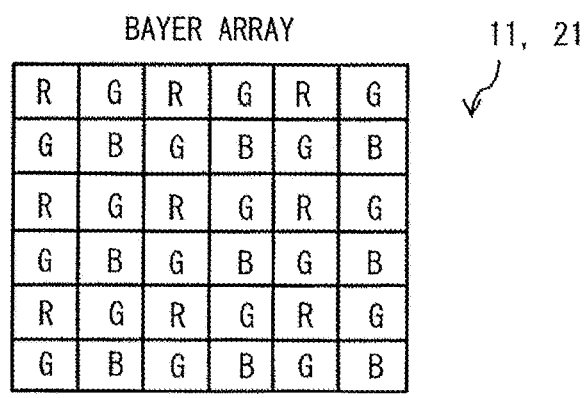

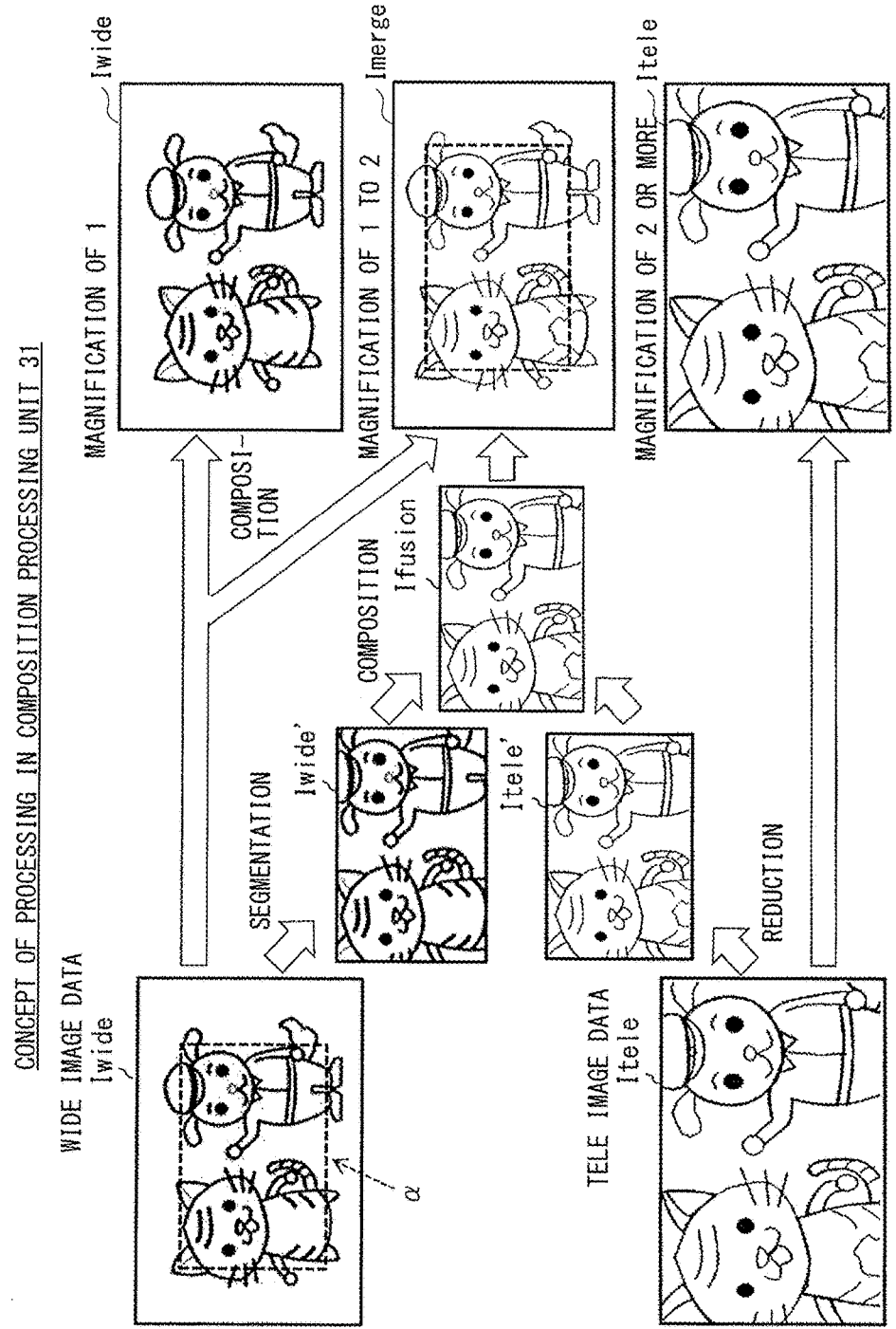

[ FIG. 6 ]
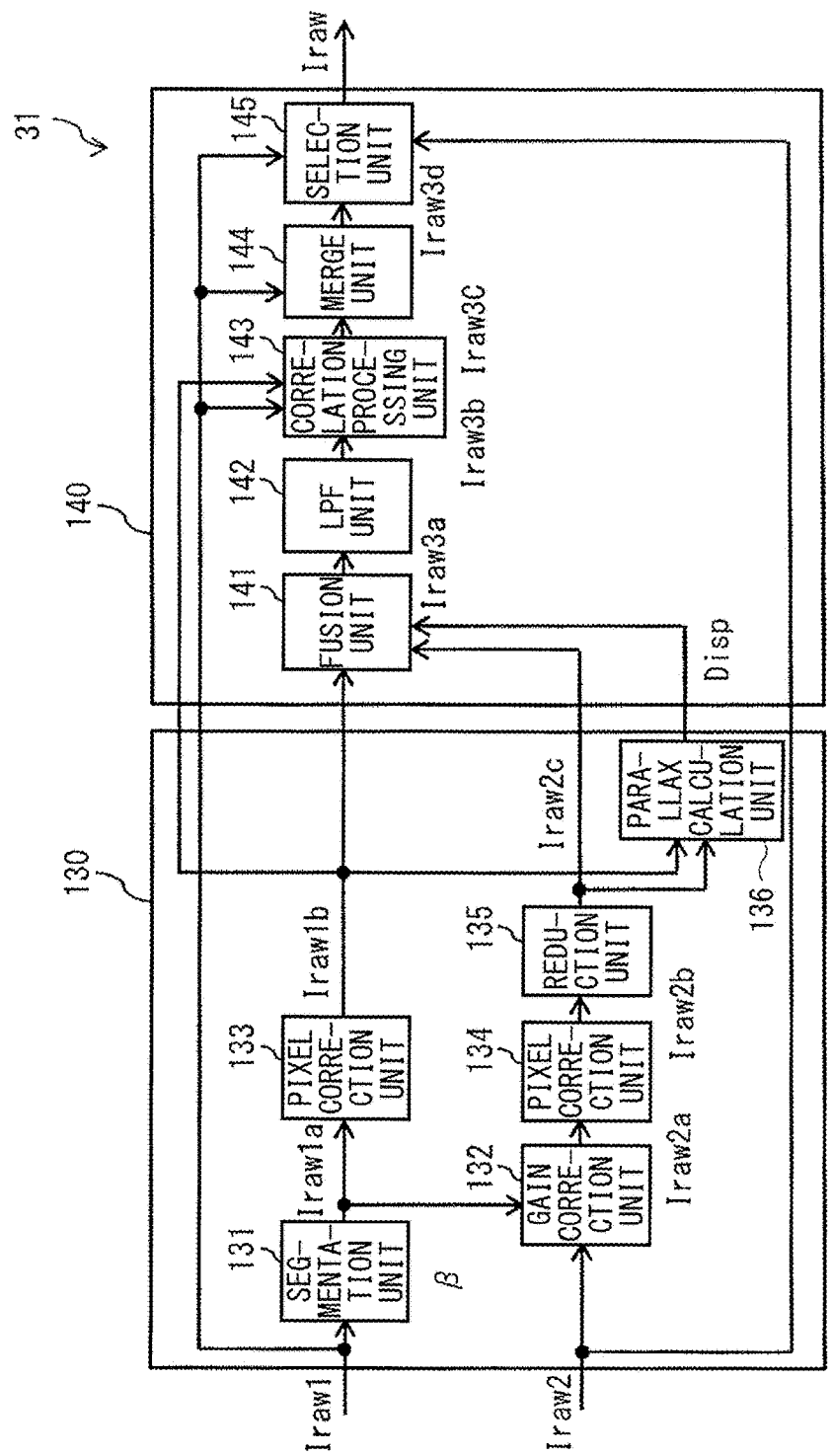

[ FIG. 7 ]
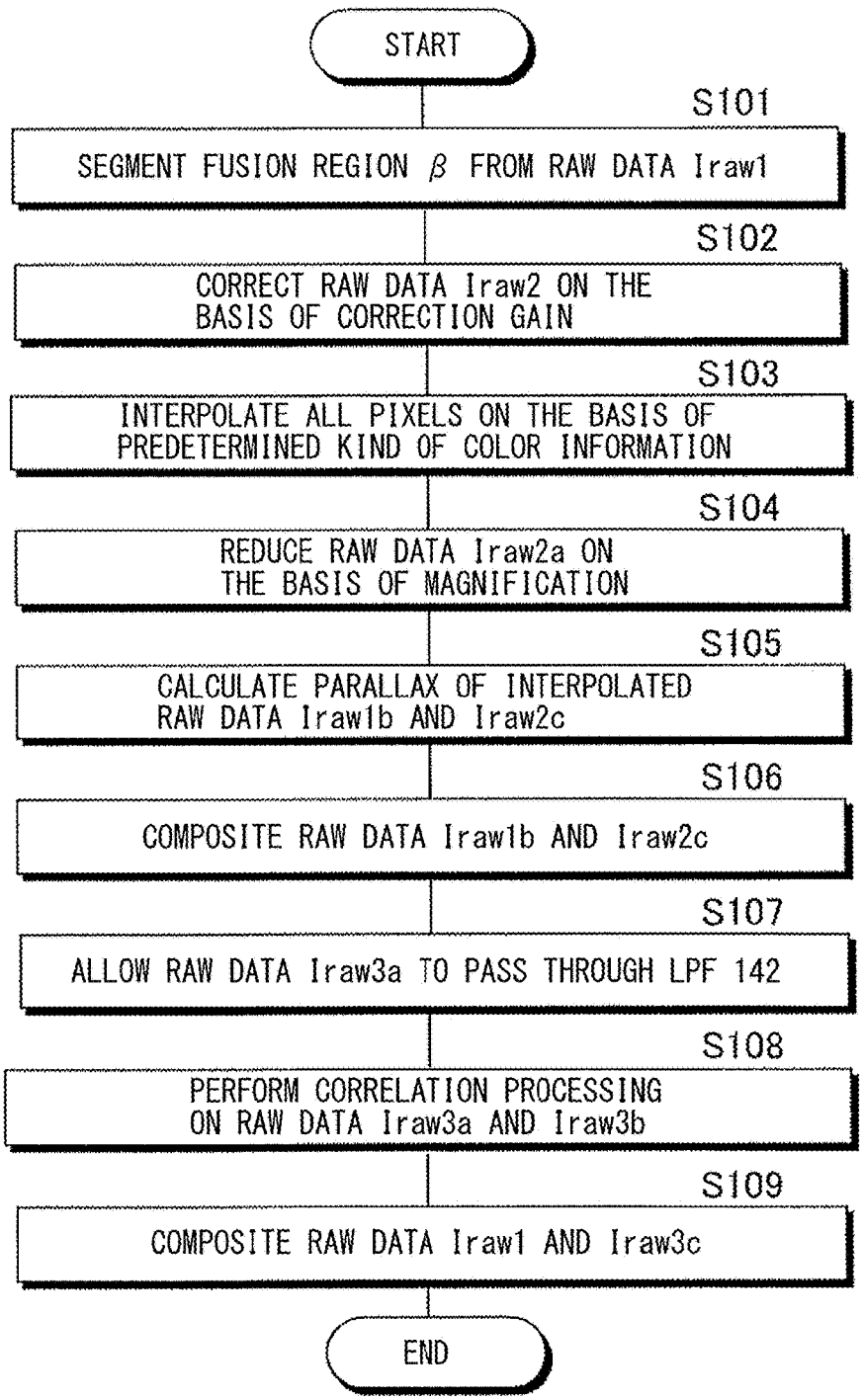

[ FIG. 8 ]
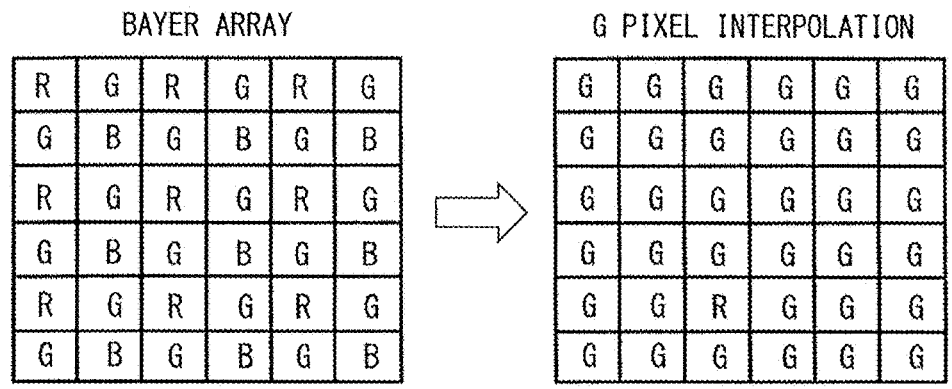
[ FIG. 9 ]
INTERPOLATION FILTER F, WITH CENTER PIXEL BEING G PIXEL
| 0 | 0 | 0 |
|---|---|---|
| 0 | 1 | 0 |
| 0 | 0 | 0 |
[ FIG. 10 ]
INTERPOLATION FILTER F, WITH CENTER PIXEL BEING R PIXEL OR B PIXEL
| 0 | 1 | 0 |
|---|---|---|
| 1 | 0 | 1 |
| 0 | 1 | 0 |

[ FIG. 11 ]
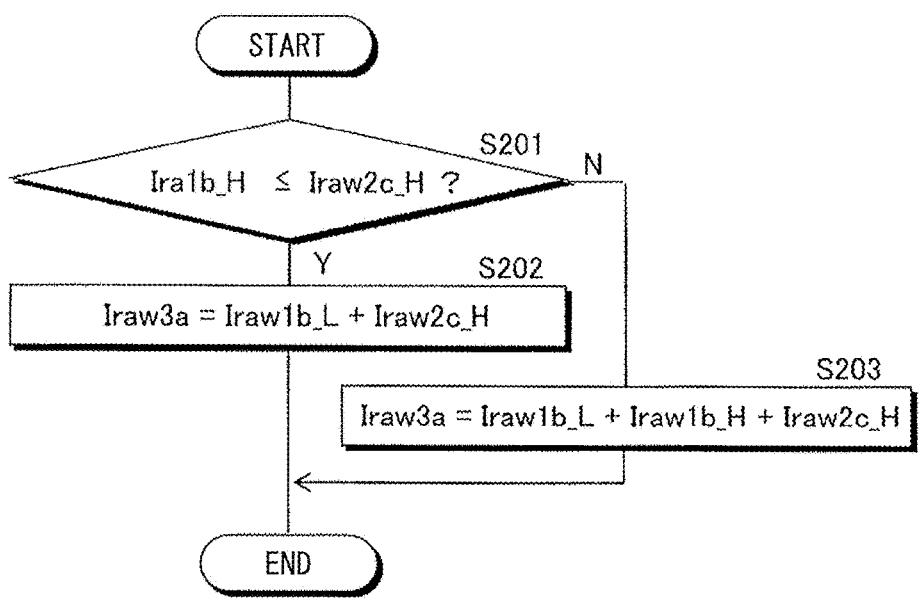

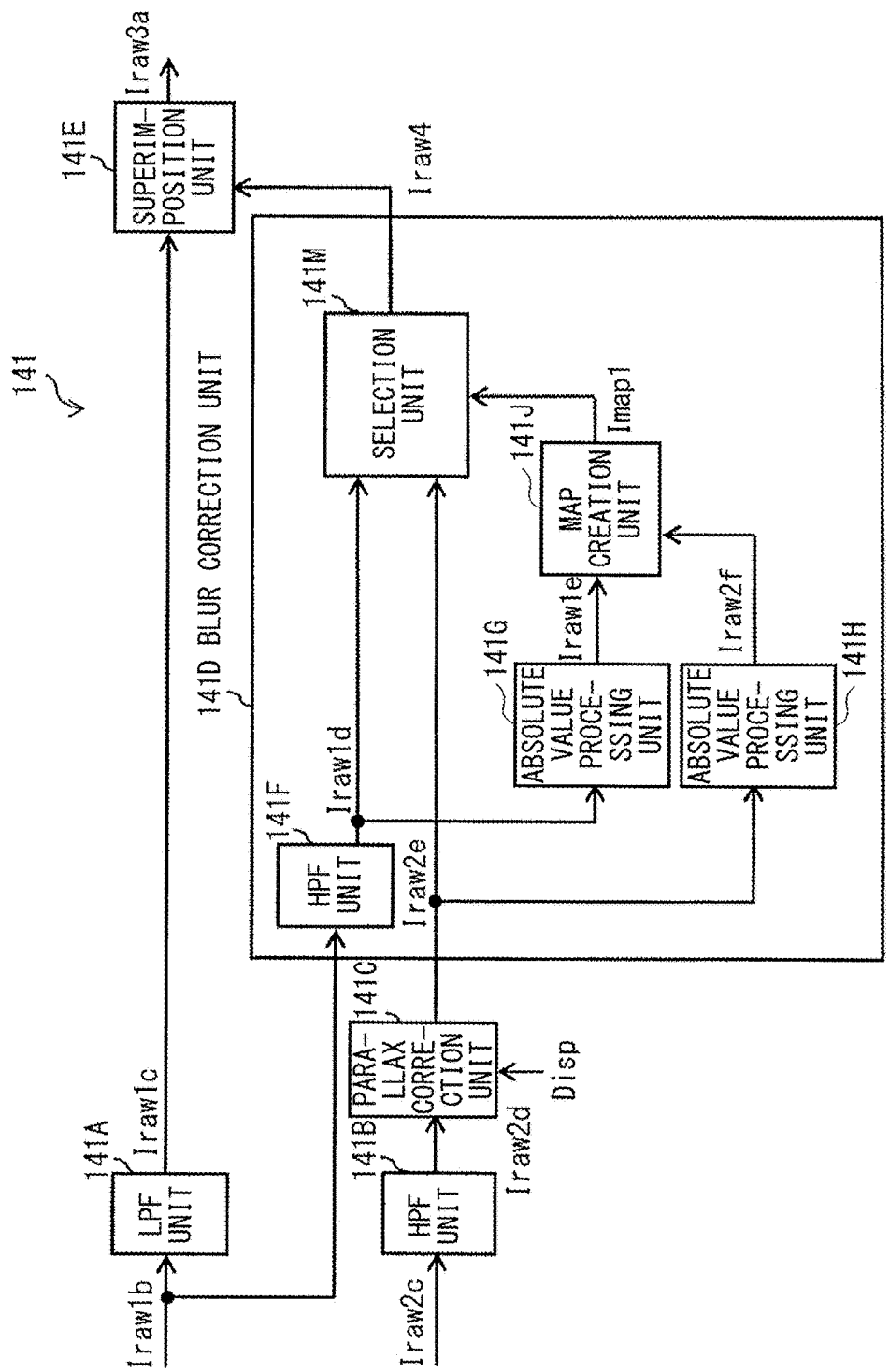
[FIG. 12]

[ FIG. 13 ]
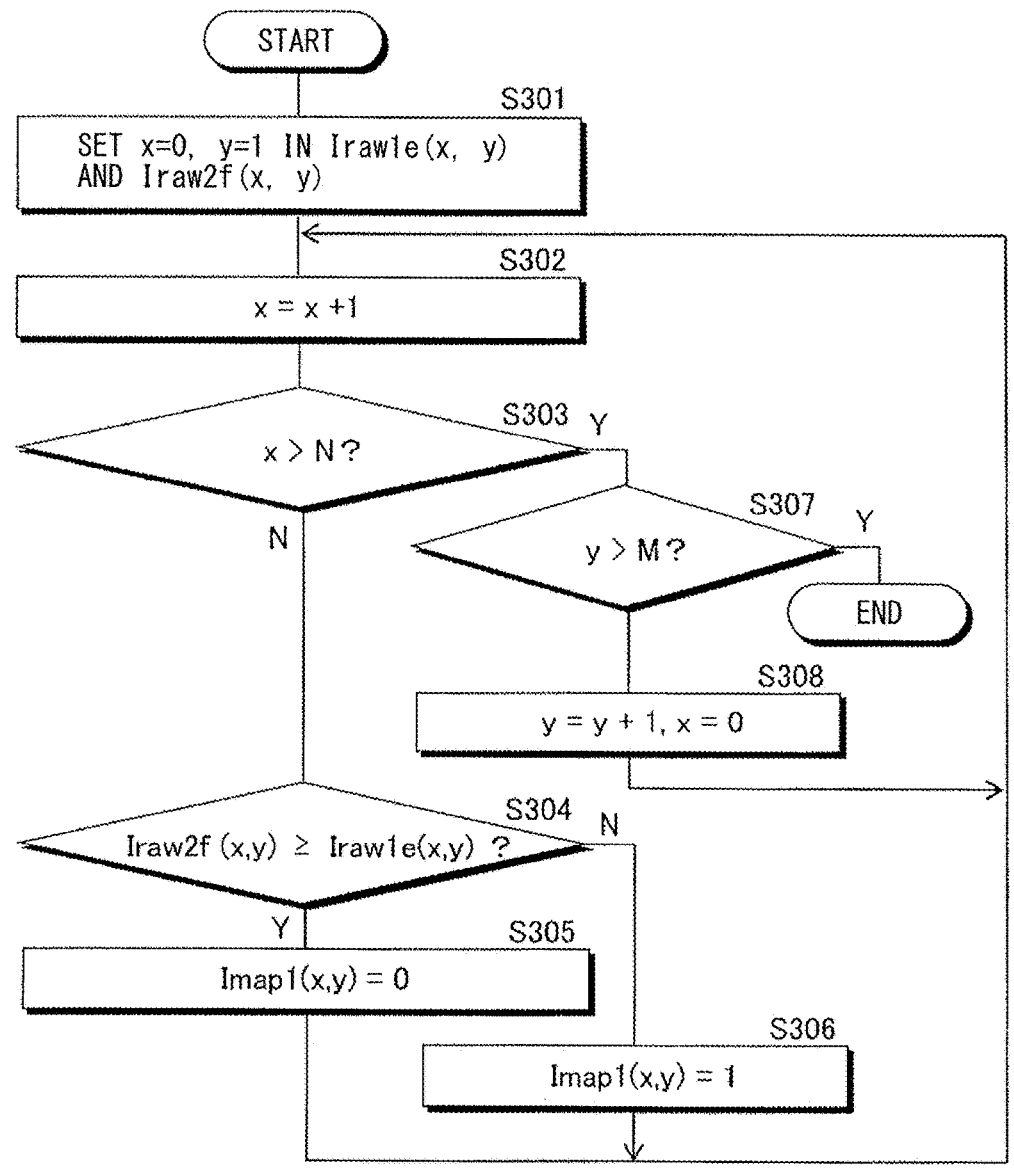

[ FIG. 14 ]
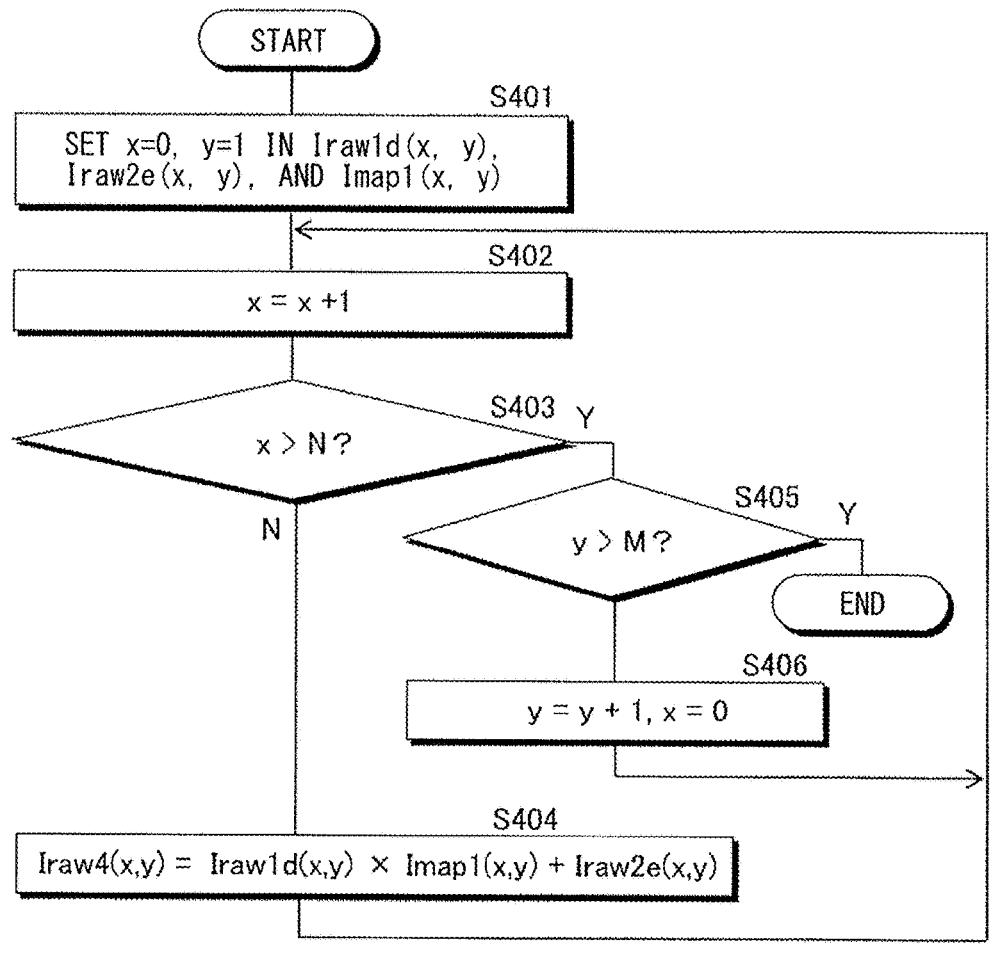

[ FIG. 15 ]
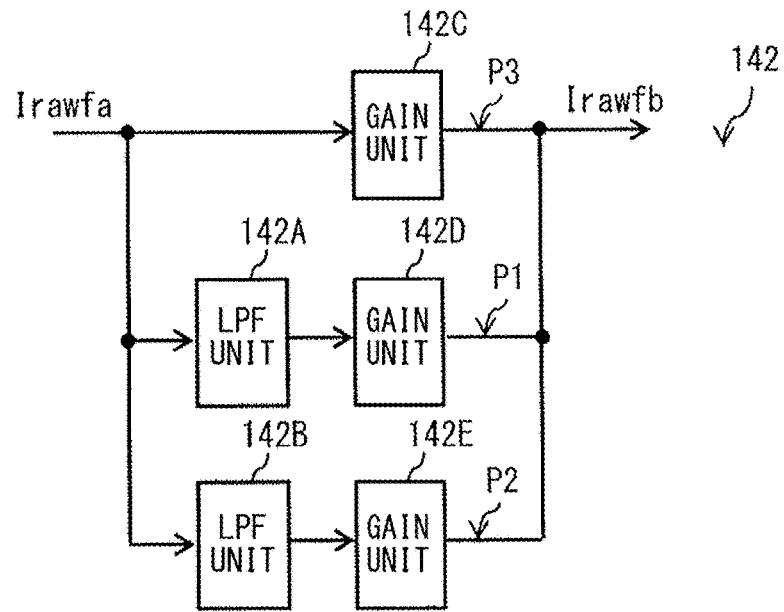
[ FIG. 16 ]
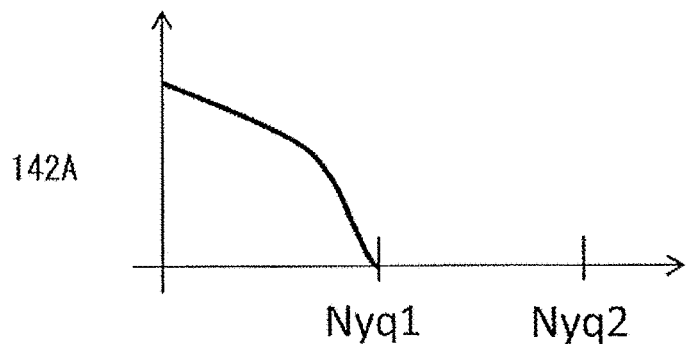
[ FIG. 17 ]
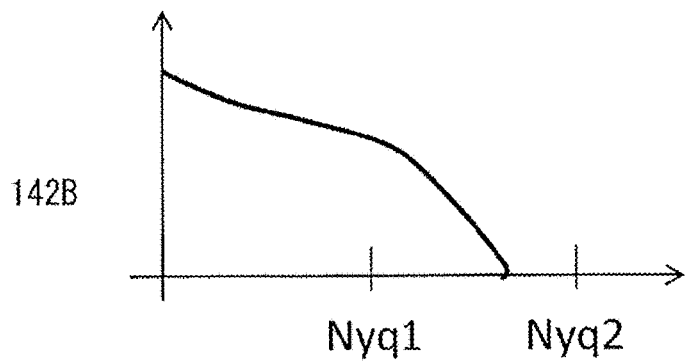

[ FIG. 18A ]

$$\underset{\text{G INTERPOLATED DATA}}{\phantom{Iraw3c}} \quad \underset{\text{COLOR DIFFERENCE COMPONENT}}{\phantom{Iraw3c}}$$

$$Iraw3c = Iraw3b + Iraw1 - Iraw1b$$

$$R_{raw3c} = G_{raw3b} + R_{raw1} - G_{raw1b}$$
$$G_{raw3c} = G_{raw3b} + G_{raw1} - G_{raw1b}$$
$$B_{raw3c} = G_{raw3b} + B_{raw1} - G_{raw1b}$$

[ FIG. 18B ]

$$\underset{\text{G INTERPOLATED DATA}}{\phantom{Iraw3c}} \quad \underset{\text{COLOR RATIO COMPONENT}}{\phantom{Iraw3c}}$$

$$Iraw3c = Iraw3b \times Iraw1 / Iraw1b$$

$$R_{raw3c} = G_{raw3b} \times R_{raw1} / G_{raw1b}$$
$$G_{raw3c} = G_{raw3b} \times G_{raw1} / G_{raw1b}$$
$$B_{raw3c} = G_{raw3b} \times B_{raw1} / G_{raw1b}$$

[ FIG. 19 ]
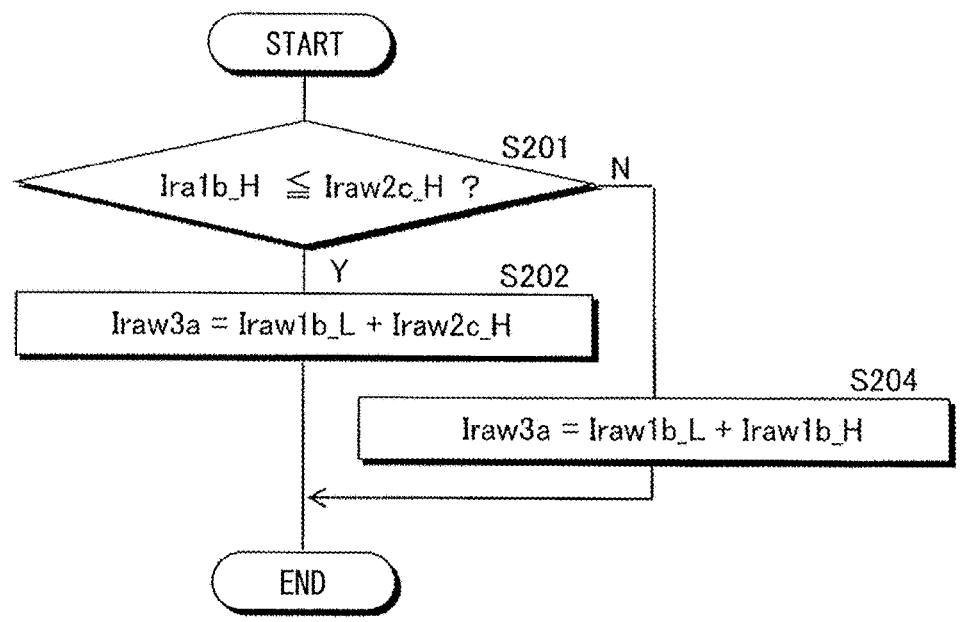

[ FIG. 20 ]
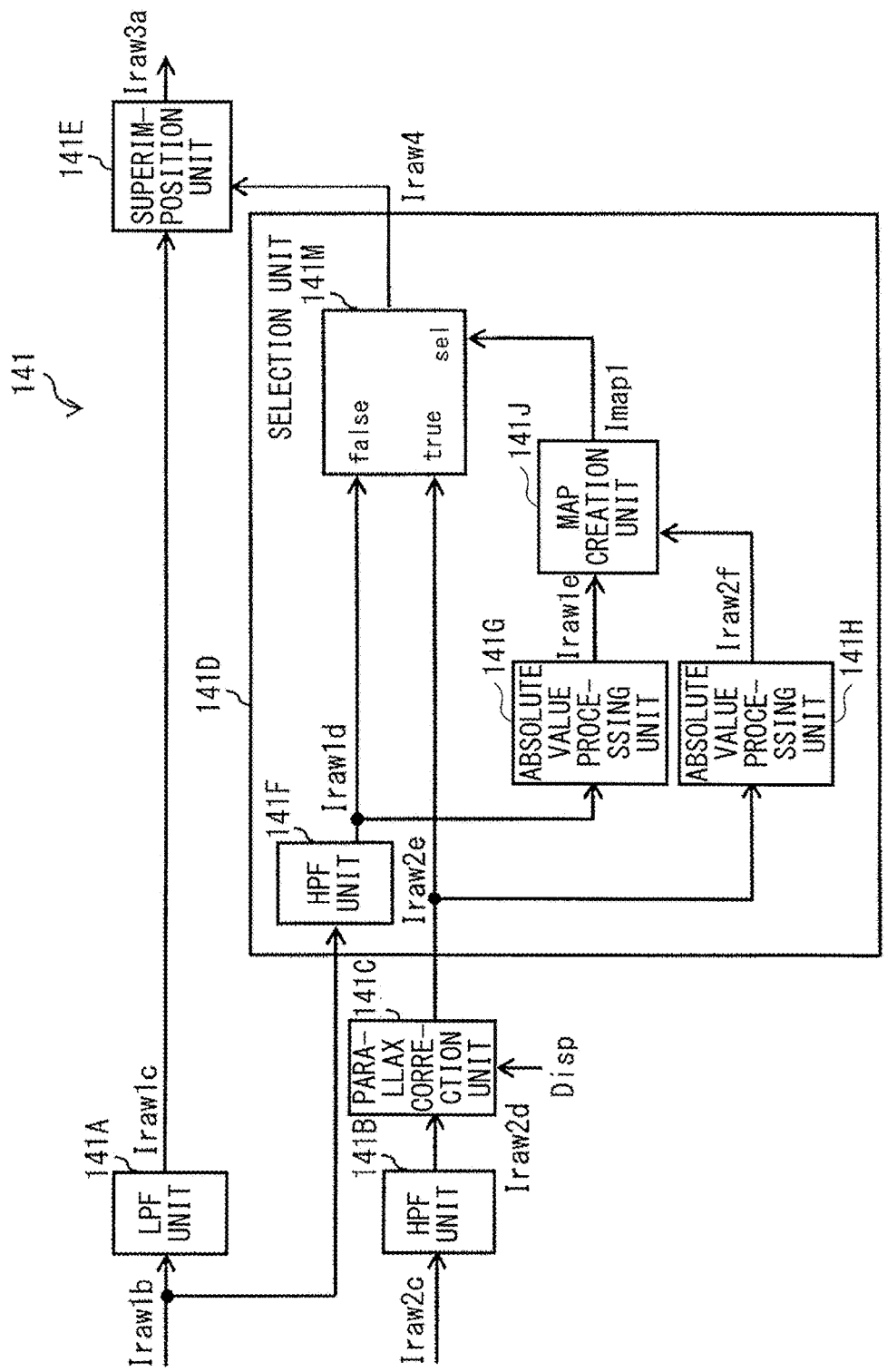

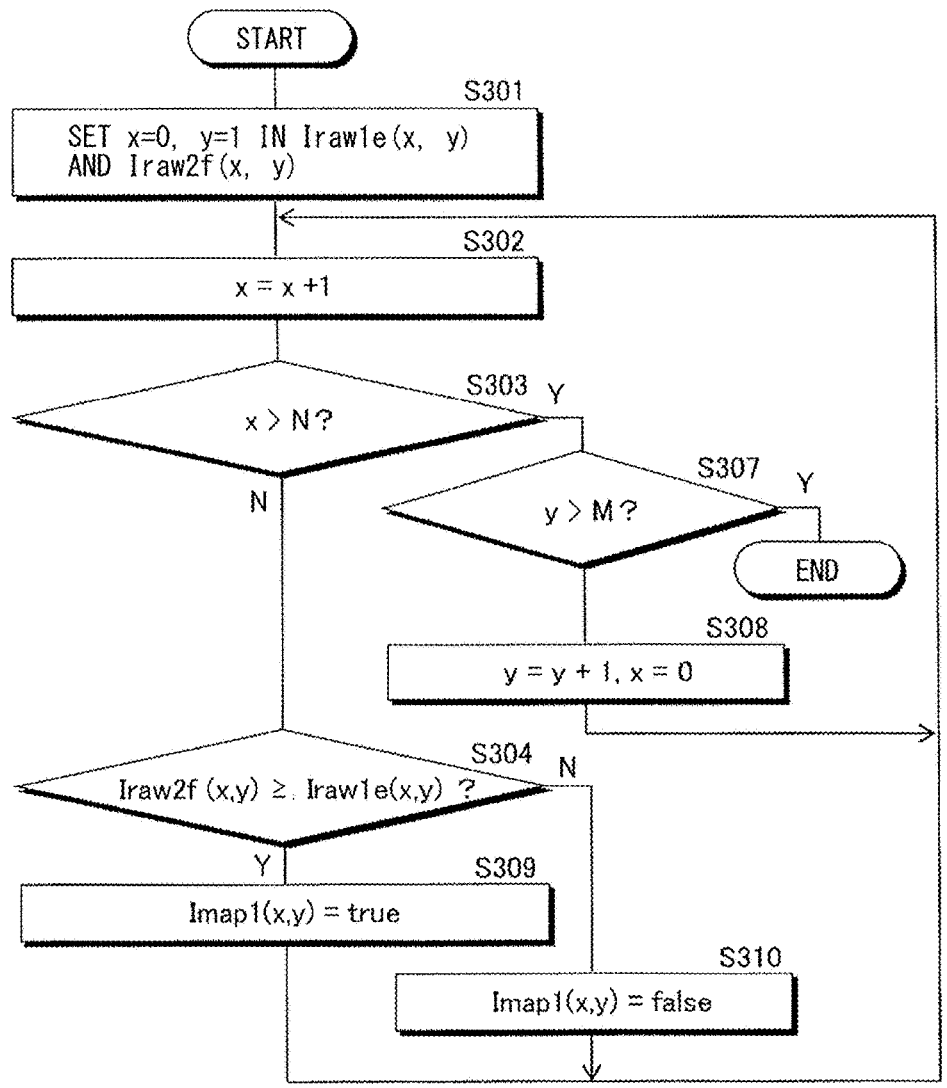
[FIG. 21]

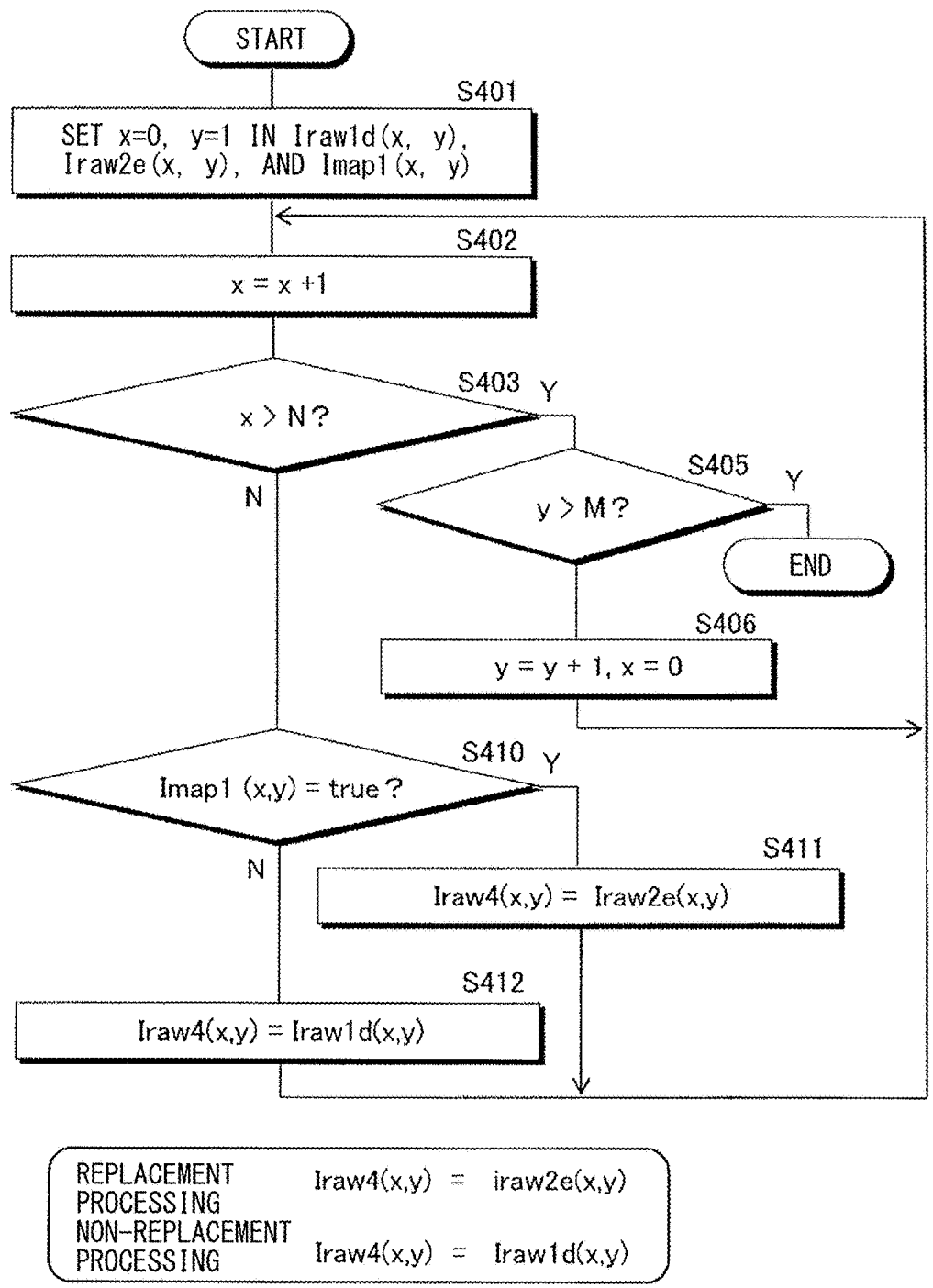
[ FIG. 22 ]

[ FIG. 23 ]
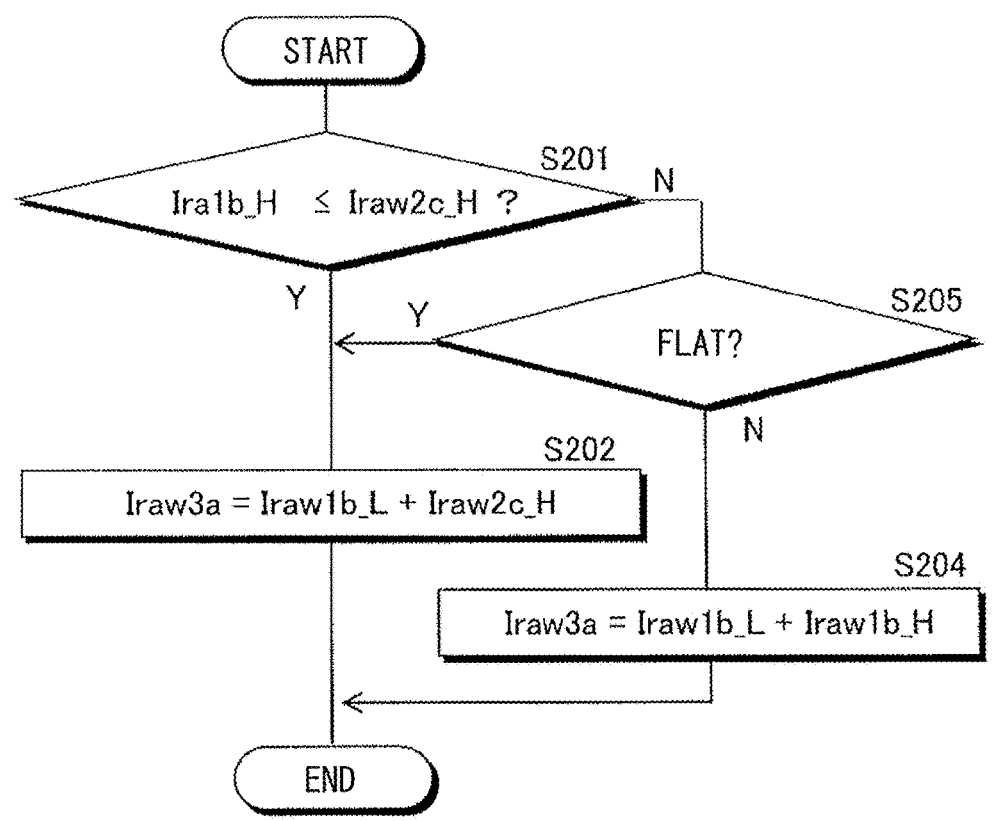

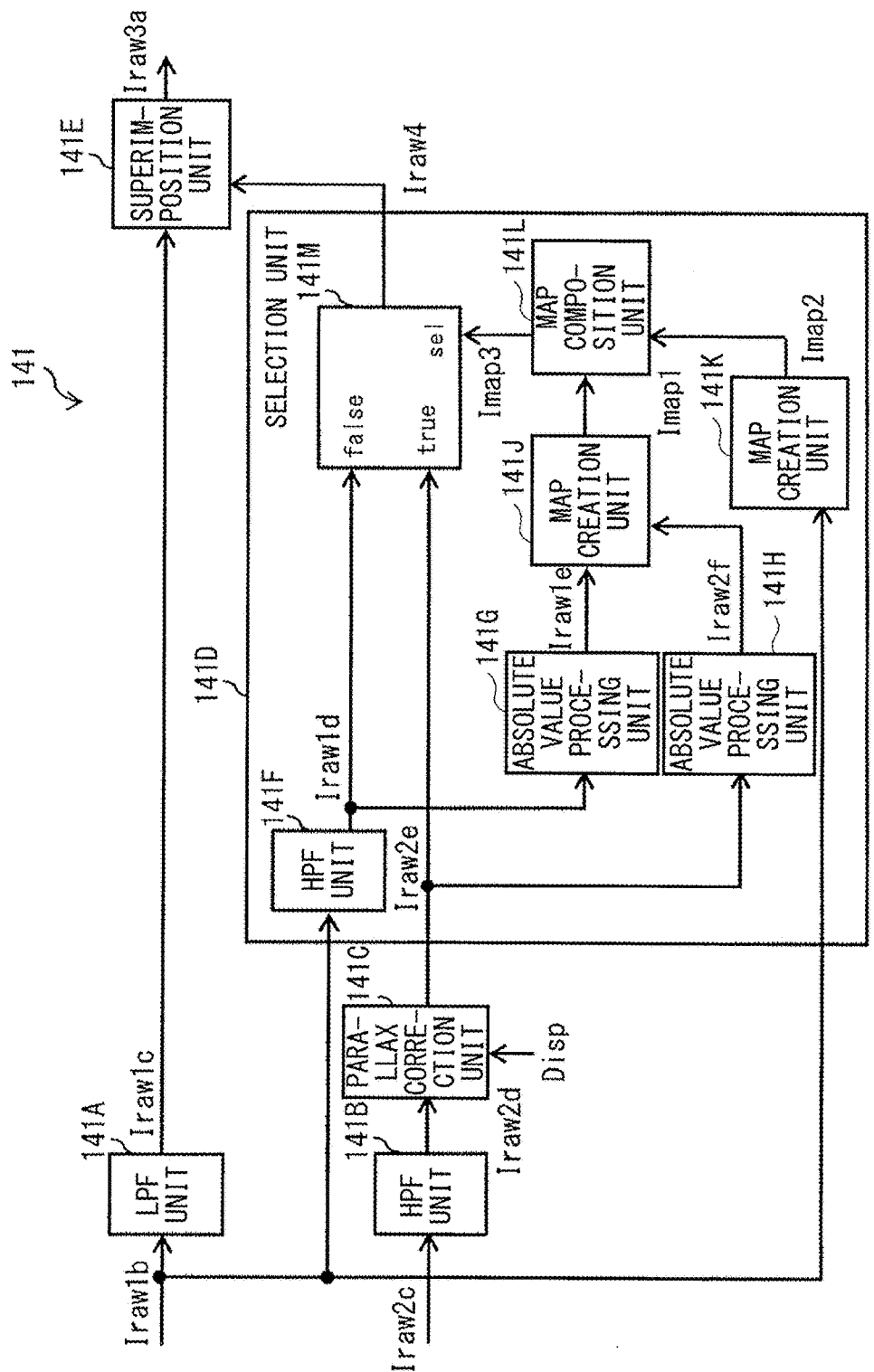
[FIG. 24]

[ FIG. 25 ]
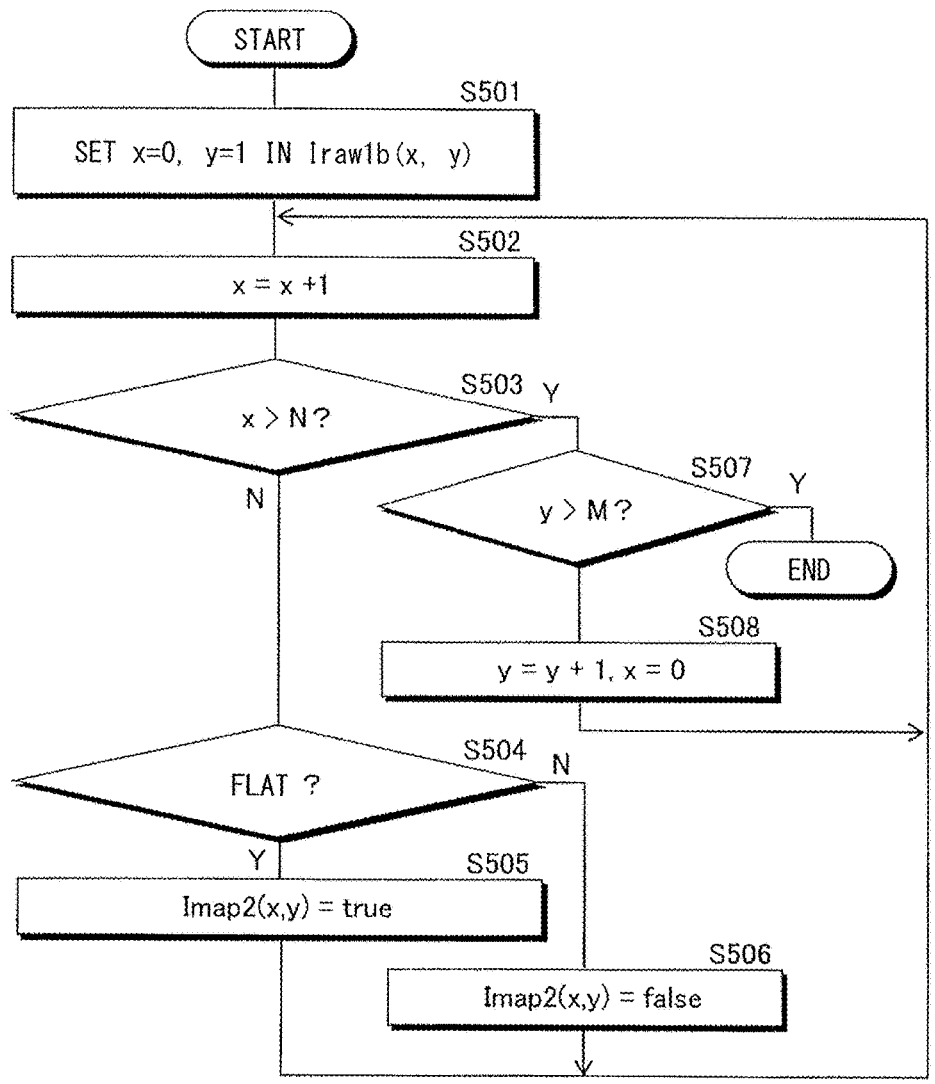

[ FIG. 26 ]
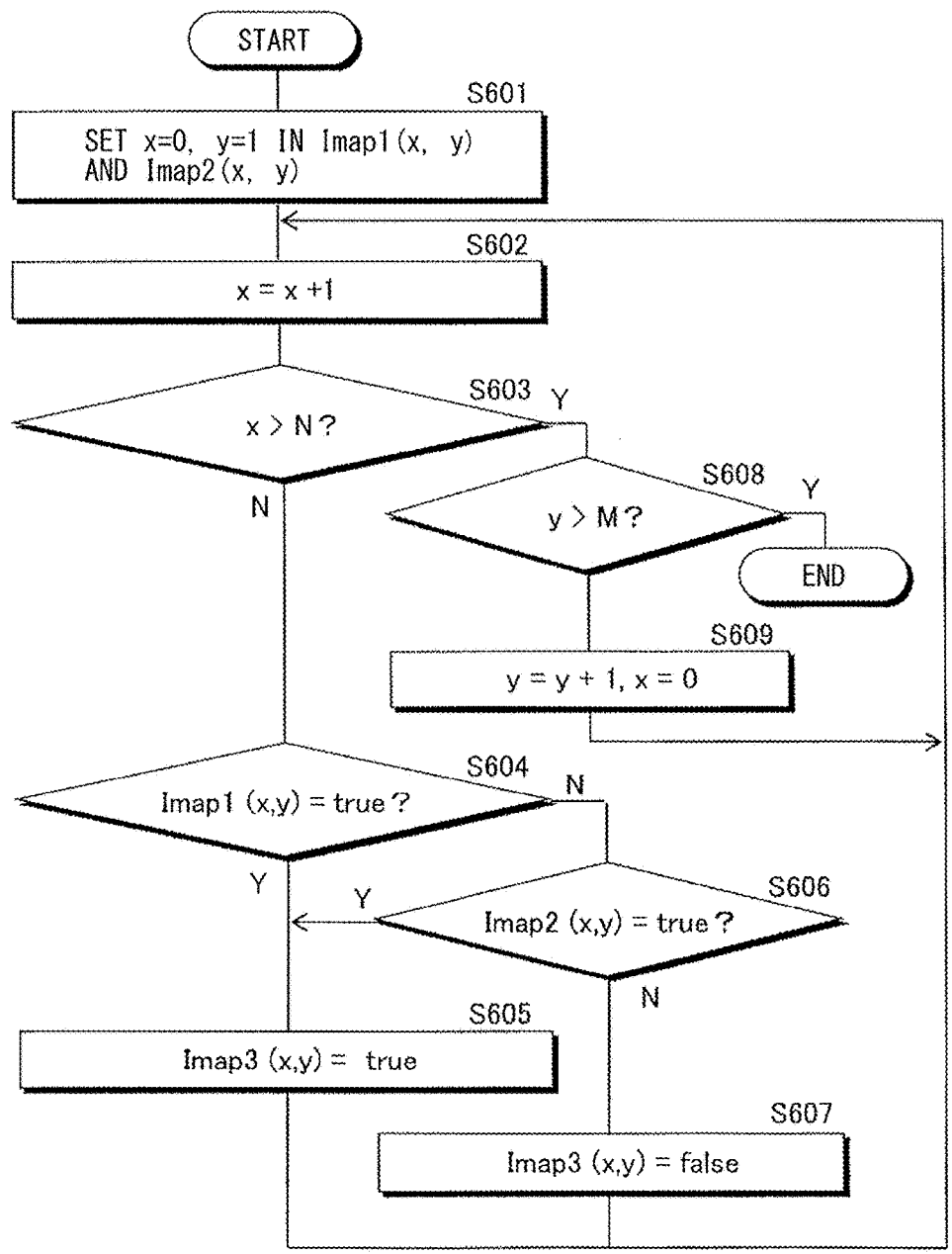

[FIG. 27]
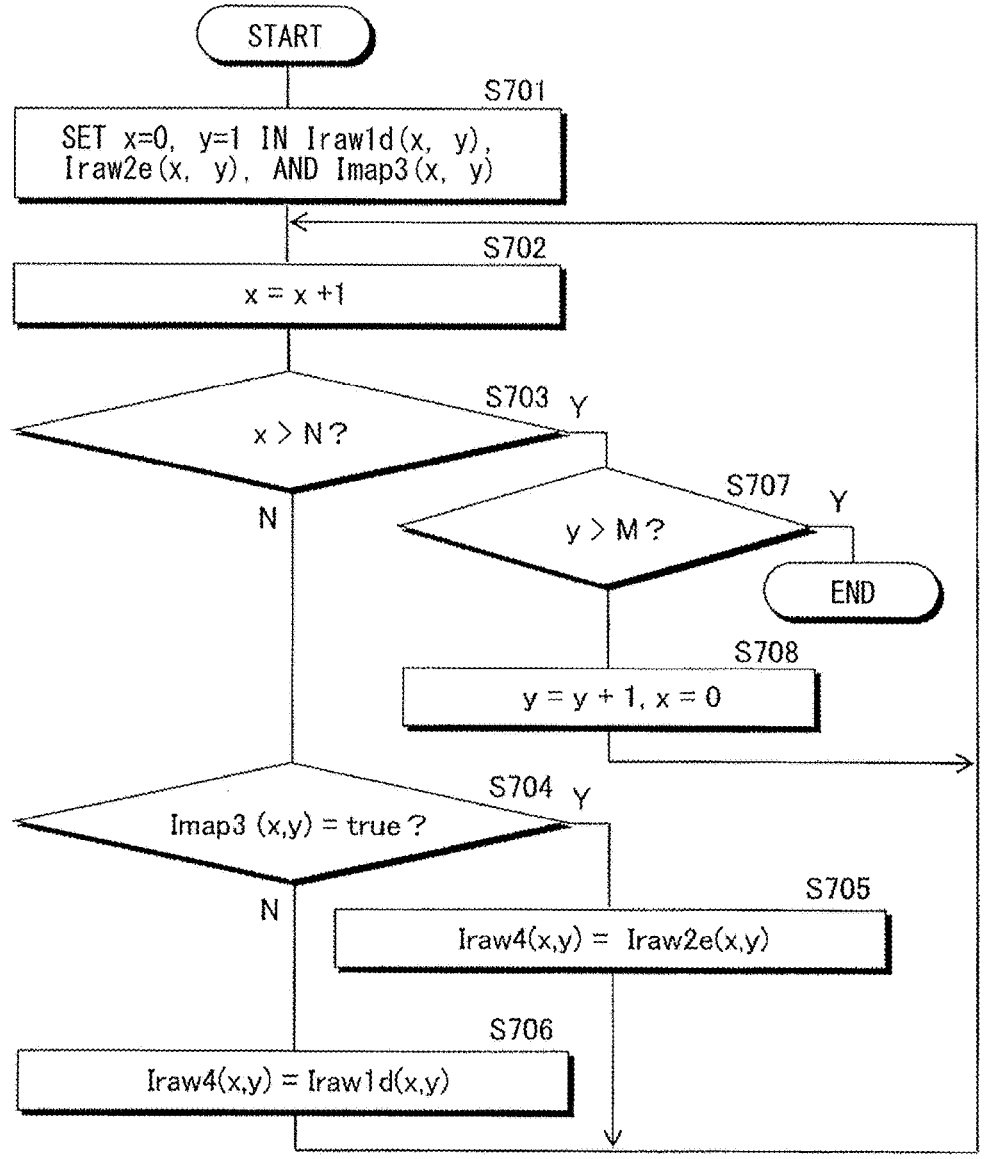

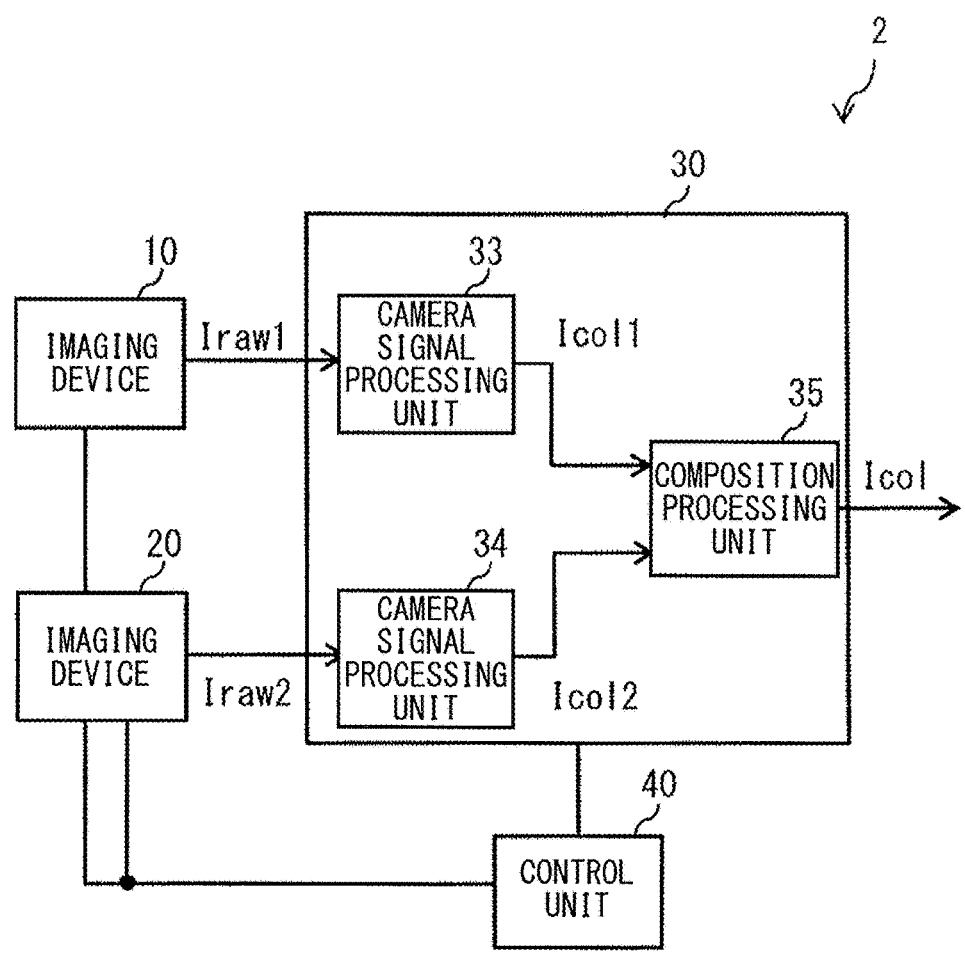
[ FIG. 28 ]

[FIG. 29]
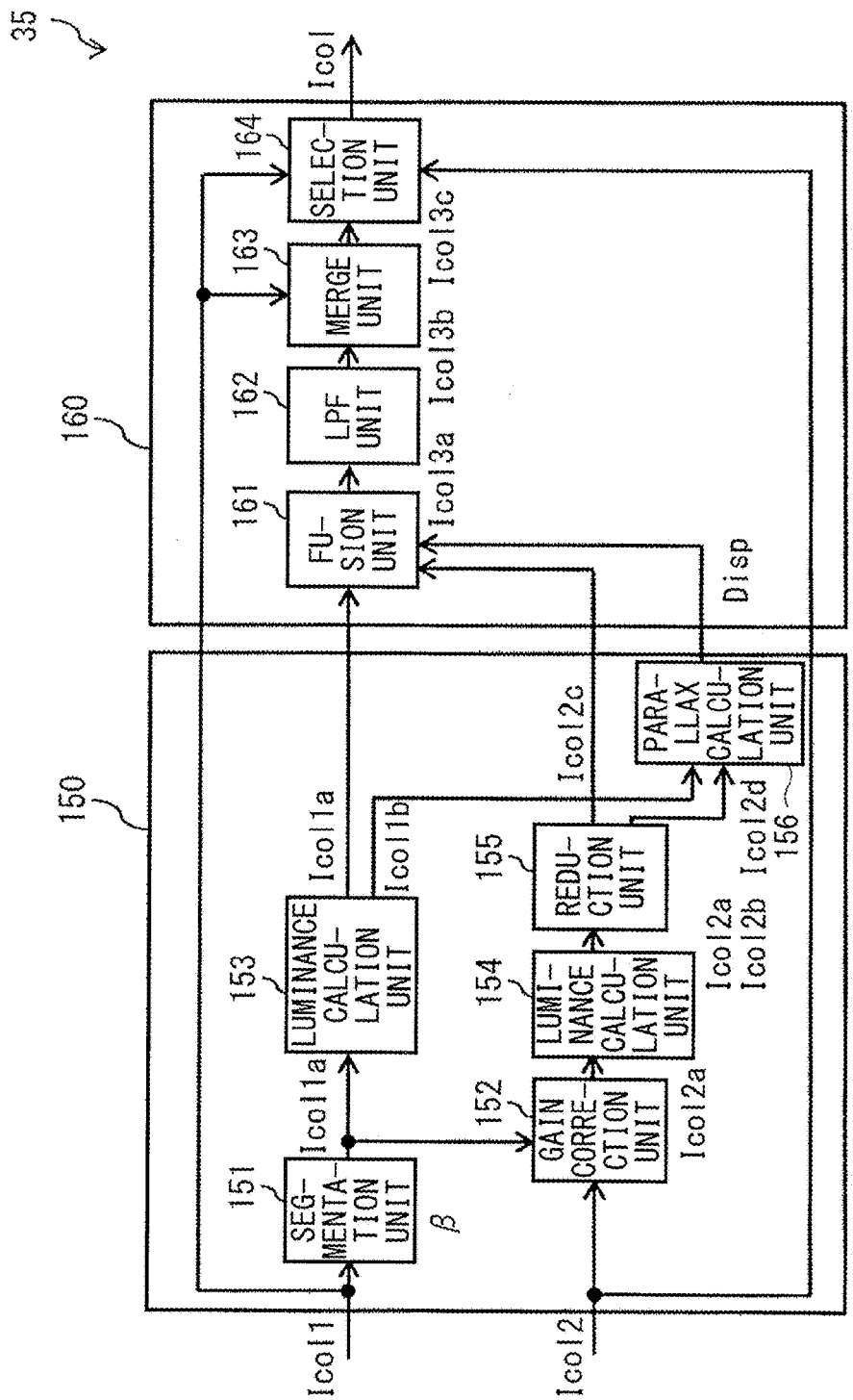

[ FIG. 30 ]
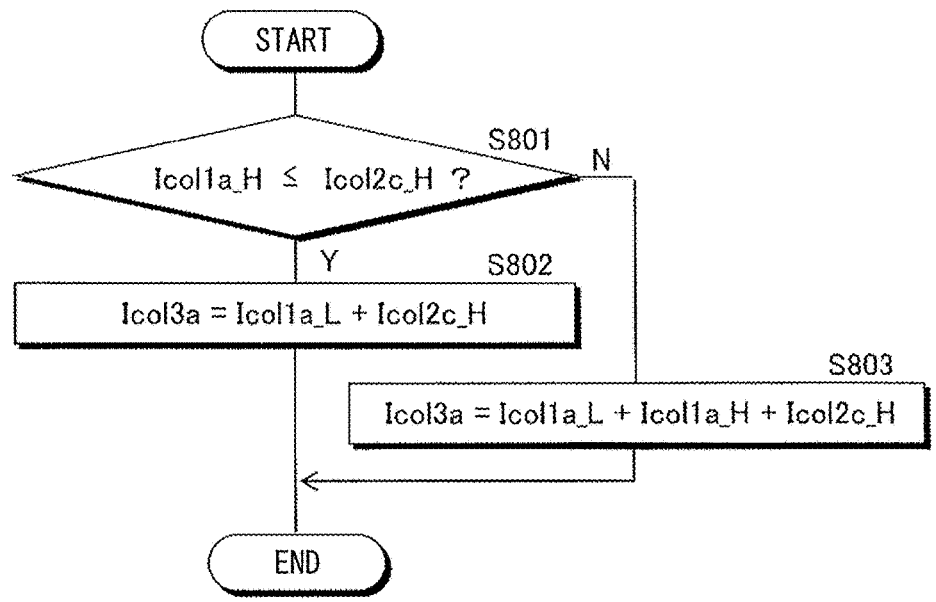
[ FIG. 31 ]
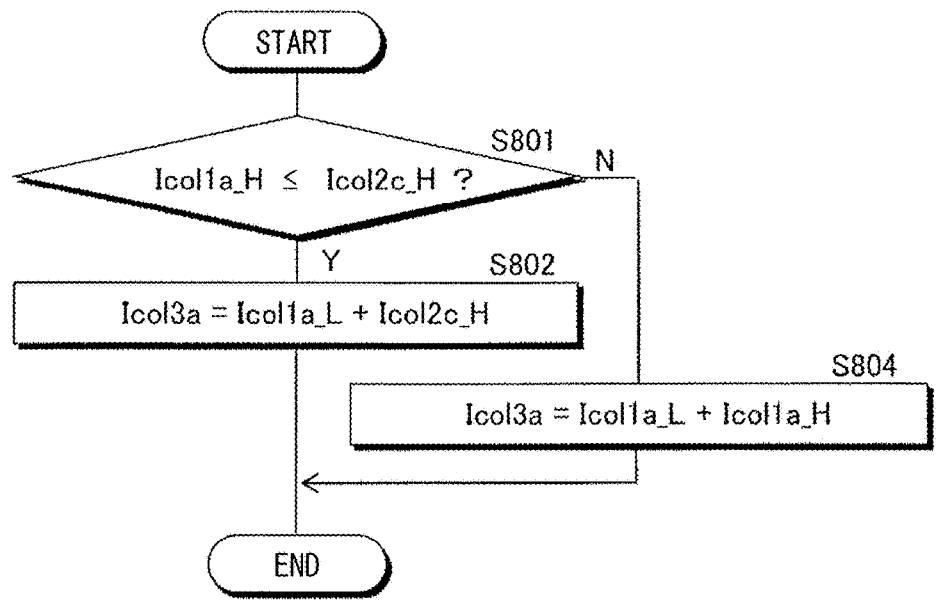

[ FIG. 32 ]
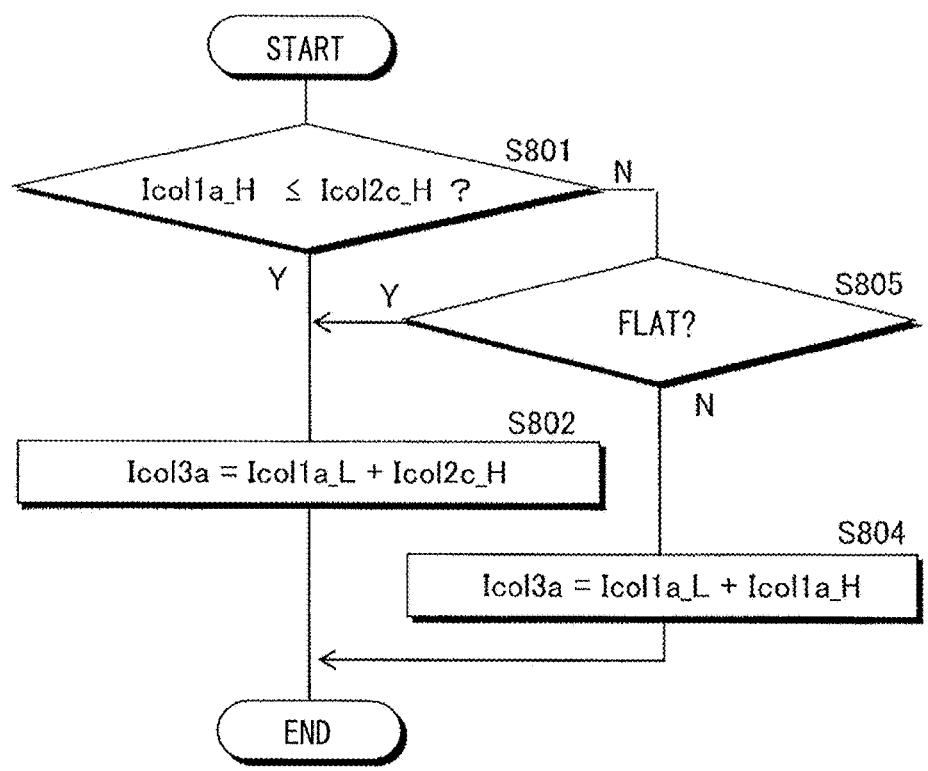

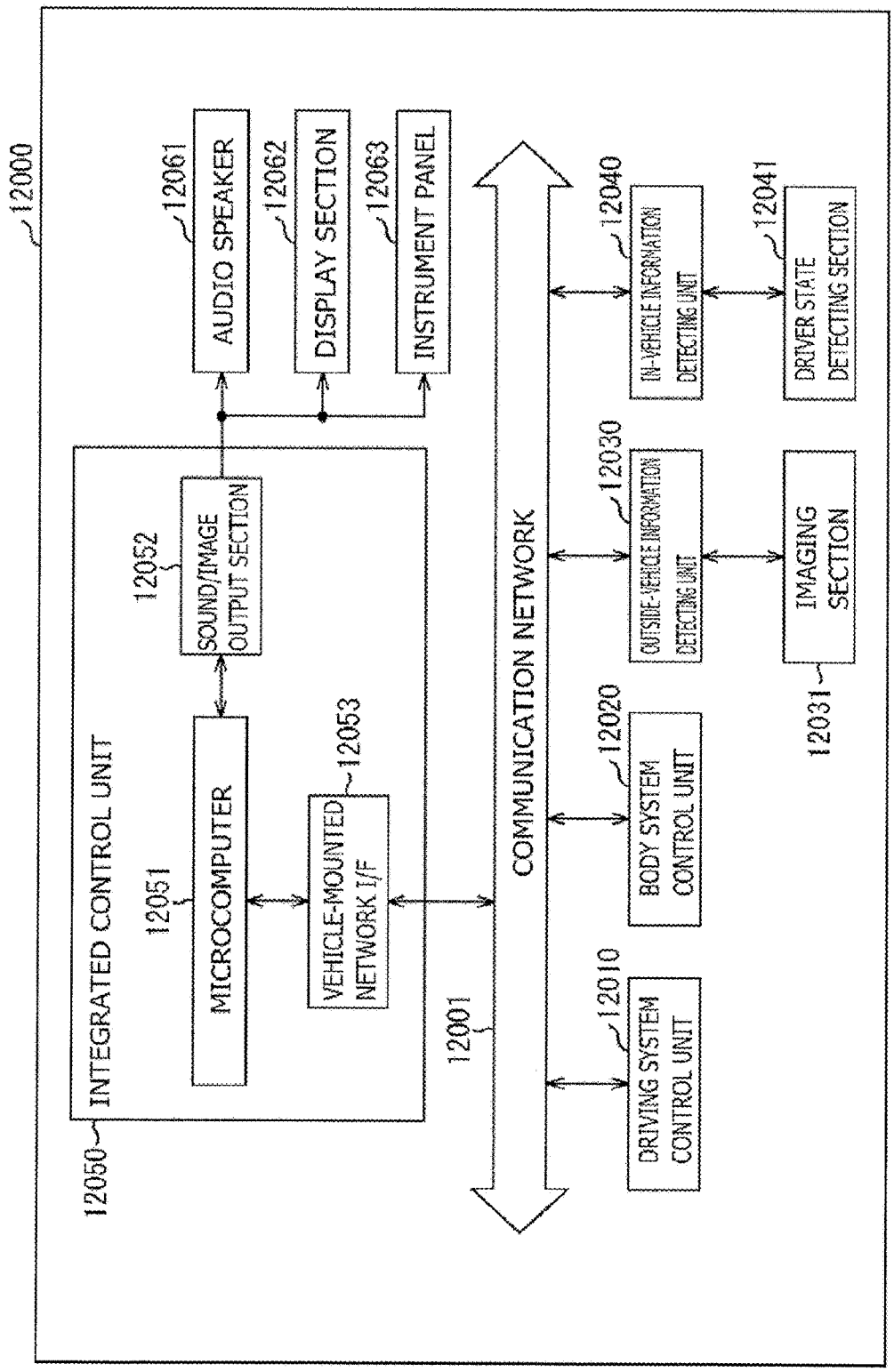
[FIG. 33]

[ FIG. 34 ]
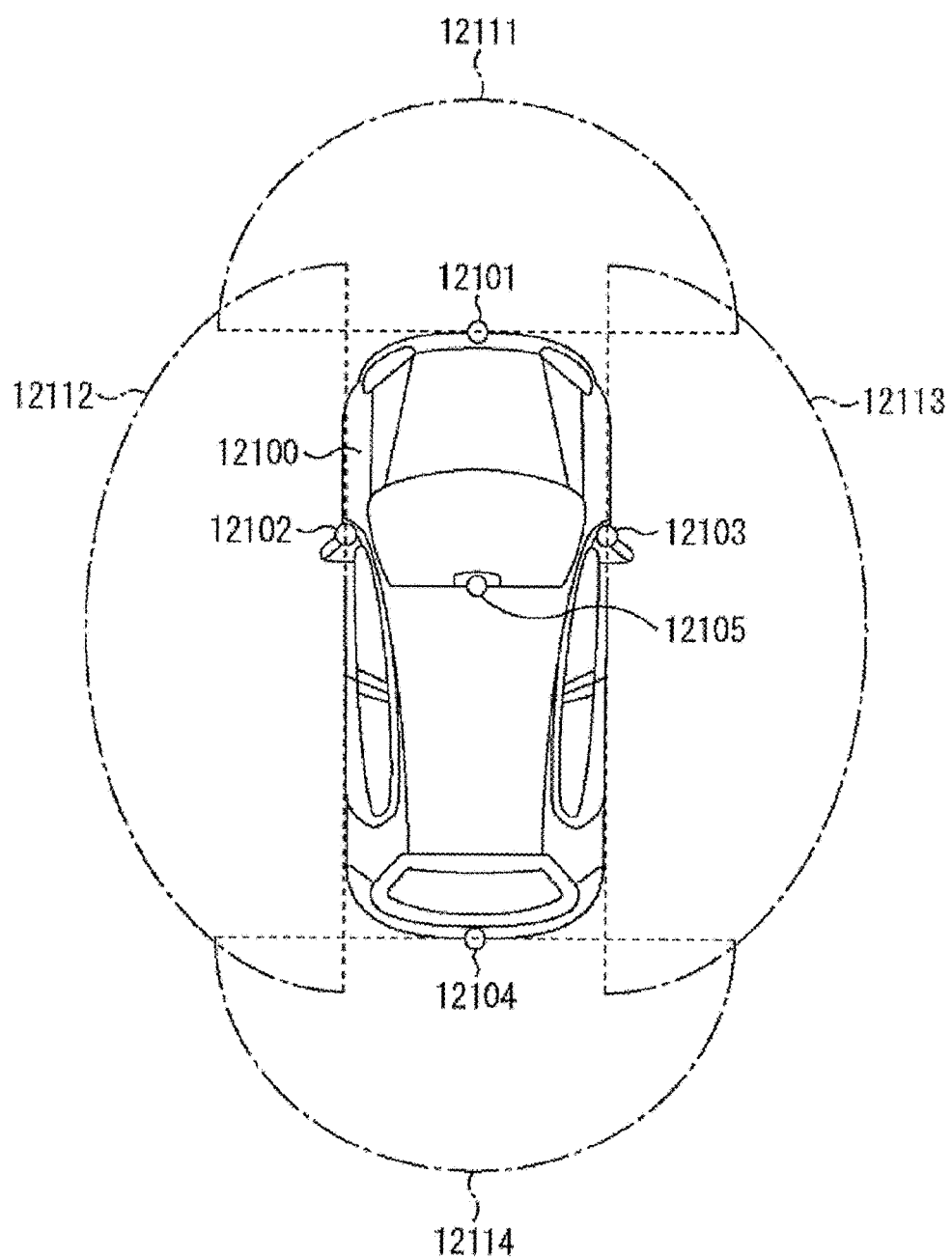

SIGNAL PROCESSING APPARATUS AND IMAGING APPARATUS

CROSS REFERENCE TO RELATED APPLICATIONS

This is a U.S. National Stage Application under 35 U.S.C. § 371, based on International Application No. PCT/JP2017/005847, filed Feb. 17, 2017, which claims priority to Japanese Patent Application JP 2016-080132, filed Apr. 13, 2016, each of which is hereby incorporated by reference in its entirety.

TECHNICAL FIELD

The disclosure relates to a signal processing apparatus and an imaging apparatus.

BACKGROUND ART

Proposals have been previously made for an imaging system that captures an image of a wide visual field and high resolution, with the use of two imaging devices (for example, refer to PTL 1). It is said that in the existing imaging system, for example, in imaging data of a relatively wide angle of view, replacing a high-frequency component with a high-frequency component in imaging data of a relatively narrow angle of view makes it possible to obtain the image of the wide visual field and the high resolution.

CITATION LIST

Patent Literature

PTL 1: Japanese Unexamined Patent Application Publication No. 2003-134375

SUMMARY OF THE INVENTION

In the existing imaging system, however, the imaging data of the relatively narrow angle of view includes a blur. Accordingly, in the imaging data of the relatively wide angle of view, replacement of the high-frequency component with the high-frequency component of the imaging data of the relatively narrow angle of view only results in possibility of lowered resolution. It is therefore desirable to provide a signal processing apparatus and an imaging apparatus that make it possible to avoid such lowered resolution caused by image composition, in a simple method.

A first signal processing apparatus according to an embodiment of the disclosure includes a composition unit that generates first composite imaging data, by adding together a low-frequency component of first imaging data, a high-frequency component of the first imaging data, and a high-frequency component of second imaging data. The first imaging data is imaging data of a relatively wide angle of view, out of two pieces of imaging data that differ in angle of view from each other. The second imaging data is imaging data of a relatively narrow angle of view, out of the two pieces of the imaging data.

A first imaging apparatus according to an embodiment of the disclosure includes two imaging devices that generate respective pieces of imaging data that differ in angle of view from each other. The imaging apparatus further includes a composition unit that generates first composite imaging data, by adding together a low-frequency component of first imaging data, a high-frequency component of the first imaging data, and a high-frequency component of second imaging data. The first imaging data is the imaging data that has been generated by one of the imaging devices and has a relatively wide angle of view. The second imaging data is the imaging data that has been generated by another of the imaging devices and has a relatively narrow angle of view.

In the first signal processing apparatus and the first imaging apparatus according to the embodiments of the disclosure, the first composite imaging data is generated, by adding together the low-frequency component of the first imaging data, the high-frequency component of the first imaging data, and the high-frequency component of the second imaging data. The first imaging data has the relatively wide angle of view. The second imaging data has the relatively narrow angle of view. Thus, with the second imaging data including a blur, influences of the blur are alleviated, as compared to a case where in the first imaging data of the relatively wide angle of view, the high-frequency component is replaced with the high-frequency component of the second imaging data of the relatively narrow angle of view.

A second signal processing apparatus according to an embodiment of the disclosure includes a composition unit that generates first composite imaging data, on the condition that a high-frequency component of first imaging data is larger than a high-frequency component of second imaging data, by adding together a low-frequency component of the first imaging data and the high-frequency component of the second imaging data. The first imaging data is imaging data of a relatively wide angle of view, out of two pieces of imaging data that differ in angle of view from each other. The second imaging data is imaging data of a relatively narrow angle of view, out of the two pieces of the imaging data. Furthermore, the composition unit generates second composite imaging data, on the condition that the high-frequency component of the first imaging data is smaller than the high-frequency component of the second imaging data, by adding together the low-frequency component of the first imaging data and the high-frequency component of the first imaging data.

A second imaging apparatus according to an embodiment of the disclosure includes two imaging devices that generate respective pieces of imaging data that differ in angle of view from each other. The imaging apparatus includes a composition unit that generates first composite imaging data, on the condition that a high-frequency component of first imaging data is larger than a high-frequency component of second imaging data, by adding together a low-frequency component of the first imaging data and the high-frequency component of the second imaging data. The first imaging data is the imaging data that has been generated by one of the imaging devices and has a relatively wide angle of view. The second imaging data is the imaging data that has been generated by another of the imaging devices and has a relatively narrow angle of view. Furthermore, the composition unit generates second composite imaging data, on the condition that the high-frequency component of the first imaging data is smaller than the high-frequency component of the second imaging data, by adding together the low-frequency component of the first imaging data and the high-frequency component of the first imaging data.

In the second signal processing apparatus and the second imaging apparatus according to the embodiments of the disclosure, the first composite imaging data is generated, on the condition that the high-frequency component of the first imaging data is larger than the high-frequency component of the second imaging data, by adding together the low-frequency component of the first imaging data and the high-frequency component of the second imaging data. The first imaging data is the imaging data of the relatively wide angle of view. The second imaging data is the imaging data of the relatively narrow angle of view. Furthermore, the second composite imaging data is generated, on the condition that the high-frequency component of the first imaging data is smaller than the high-frequency component of the second imaging data, by adding together the low-frequency component of the first imaging data and the high-frequency component of the first imaging data. Thus, with the second imaging data including a blur, influences of the blur are alleviated, as compared to a case where in the first imaging data of the relatively wide angle of view, the high-frequency component is replaced with the high-frequency component of the second imaging data of the relatively narrow angle of view.

According to the first signal processing apparatus and the first imaging apparatus of the embodiments of the disclosure, the first composite imaging data is generated, by adding together the low-frequency component of the first imaging data, the high-frequency component of the first imaging data, and the high-frequency component of the second imaging data. The first imaging data has the relatively wide angle of view. The second imaging data has the relatively narrow angle of view. Thus, with the second imaging data including the blur, it is possible to alleviate the influences of the blur. Hence, it is possible to avoid lowered resolution caused by image composition, in a simple method.

According to the second signal processing apparatus and the second imaging apparatus of the embodiments of the disclosure, the first composite imaging data is generated, on the condition that the high-frequency component of the first imaging data is larger than the high-frequency component of the second imaging data, by adding together the low-frequency component of the first imaging data and the high-frequency component of the second imaging data. The first imaging data is the imaging data of the relatively wide angle of view. The second imaging data is the imaging data of the relatively narrow angle of view. Meanwhile, the second composite imaging data is generated, on the condition that the high-frequency component of the first imaging data is smaller than the high-frequency component of the second imaging data, by adding together the low-frequency component of the first imaging data and the high-frequency component of the second imaging data. Accordingly, with the second imaging data including the blur, it is possible to alleviate the influences of the blur. Hence, it is possible to avoid the lowered resolution caused by the image composition, in the simple method.

It is to be noted that effects of the disclosure are not necessarily limited to the effects described above, and may include any of effects that are described herein.

BRIEF DESCRIPTION OF DRAWING

FIG. 1 is a diagram that illustrates one example of a schematic configuration of an imaging apparatus according to a first embodiment of the disclosure.

FIG. 2 is a diagram that illustrates one example of a schematic configuration of the imaging apparatus.

FIG. 3 is a diagram that illustrates one example of functional blocks of the imaging apparatus in FIGS. 1 and 2.

FIG. 4 is a diagram that illustrates one example of a pixel array in an imaging element in FIG. 3.

FIG. 5 is a diagram that illustrates one example of a concept of signal processing in a composition processing unit in FIG. 3.

FIG. 6 is a diagram that illustrates one example of functional blocks of the composition processing unit in FIG. 3.

FIG. 7 is a diagram that illustrates one example of a signal processing procedure in the composition processing unit in FIG. 6.

FIG. 8 is a diagram that illustrates one example of pixel interpolation.

FIG. 9 is a diagram that illustrates one example of an interpolation filter, with a center pixel being a G pixel.

FIG. 10 is a diagram that illustrates one example of an interpolation filter, with a center pixel being an R pixel or a B pixel.

FIG. 11 is a diagram that illustrates one example in outline of a signal processing procedure in a fusion unit in FIG. 6.

FIG. 12 is a diagram that illustrates one example of an internal configuration of the fusion unit in FIG. 6.

FIG. 13 is a diagram that illustrates one example of a map creation procedure in the fusion unit in FIG. 11.

FIG. 14 is a diagram that illustrates one example of a signal processing procedure in the fusion unit in FIG. 11.

FIG. 15 is a diagram that illustrates one example of an internal configuration of an LPF unit in FIG. 6.

FIG. 16 is a diagram that illustrates one example of one filter out of a plurality of LPF units disposed side-by-side in an inside of the LPF unit in FIG. 15.

FIG. 17 is a diagram that illustrates one example of one filter out of the plurality of the LPF units disposed side-by-side in the inside of the LPF unit in FIG. 15.

FIG. 18A is a diagram that illustrates one example of correlation processing in a correlation processing unit in FIG. 6.

FIG. 18B is a diagram that illustrates one example of the correlation processing in the correlation processing unit in FIG. 6.

FIG. 19 is a diagram that illustrates one example in outline of the signal processing procedure in the fusion unit in FIG. 6.

FIG. 20 is a diagram that illustrates one example of the internal configuration of the fusion unit in FIG. 6.

FIG. 21 is a diagram that illustrates one example of a map creation procedure in the fusion unit in FIG. 20.

FIG. 22 is a diagram that illustrates one example of a signal processing procedure in the fusion unit in FIG. 20.

FIG. 23 is a diagram that illustrates one example in outline of the signal processing procedure in the fusion unit in FIG. 6.

FIG. 24 is a diagram that illustrates one example of the internal configuration of the fusion unit in FIG. 6.

FIG. 25 is a diagram that illustrates one example of a map creation procedure in the fusion unit in FIG. 24.

FIG. 26 is a diagram that illustrates one example of the map creation procedure in the fusion unit in FIG. 24.

FIG. 27 is a diagram that illustrates one example of a signal processing procedure in the fusion unit in FIG. 24.

FIG. 28 is a diagram that illustrates one example of functional blocks of an imaging apparatus according to a second embodiment of the disclosure.

FIG. 29 is a diagram that illustrates one example of functional blocks of a composition processing unit in FIG. 28.

FIG. 30 is a diagram that illustrates one example in outline of a signal processing procedure in a fusion unit in FIG. 29.

FIG. 31 is a diagram that illustrates one example in outline of the signal processing procedure in the fusion unit in FIG. 29.

FIG. 32 is a diagram that illustrates one example in outline of the signal processing procedure in the fusion unit in FIG. 29.

FIG. 33 is a block diagram depicting an example of schematic configuration of a vehicle control system.

FIG. 34 is a diagram of assistance in explaining an example of installation positions of an outside-vehicle information detecting section and an imaging section.

MODES FOR CARRYING OUT THE INVENTION

In the following, some embodiments of the disclosure are described in detail with reference to the drawings. It is to be noted that description is made in the following order.
1. First Embodiment
   An example with composition based on RAW data
2. Modification Examples of First Embodiment
3. Second Embodiment
   An example with composition based on color image data
4. Modification Examples of Second Embodiment
5. Common Modification Examples

1. First Embodiment

[Configuration]

FIGS. 1 and 2 illustrate one example of a schematic configuration of an imaging apparatus 1 according to a first embodiment of the disclosure. The imaging apparatus 1 obtains an image of a wide angle of view and high resolution, and/or performs optical zooming without using a mechanical zooming mechanism, with the use of two imaging devices 10 and 20.

The two imaging devices 10 and 20 are disposed, for example, with their physical disposition being horizontal with respect to each other. An optical axis AX1 of the imaging device 10 and an optical axis AX2 of the imaging device 20 are, for example, parallel to each other, as illustrated in FIG. 1. The optical axis AX1 and the optical axis AX2 may be, for example, non-parallel to each other, as illustrated in FIG. 2. At this occasion, it is preferable that the optical axis AX1 and the optical axis AX2 be directed in a direction in which a clearance between the optical axis AX1 and the optical axis AX2 narrows as is farther away from the imaging apparatus 1.

As illustrated in FIGS. 1 and 2, the imaging device 20 takes charge of, as an imaging region R2, a region other than an outer edge out of an imaging region R1 of the imaging device 10. The two imaging devices 10 and 20 generate RAW data Iraw1 and Iraw2 (imaging data) that differ in angle of view from each other. The imaging device 10 generates, by imaging, the RAW data Iraw1 (first imaging data) of a relatively wide angle of view. The imaging device 20 generates, by imaging, the RAW data Iraw2 (second imaging data) of a narrower angle of view than that of the RAW data Iraw1. Detailed description of the RAW data Iraw1 and Iraw2 is given later.

FIG. 3 illustrates one example of functional blocks of the imaging apparatus 1. The imaging apparatus 1 includes, for example, the two imaging devices 10 and 20, a signal processing unit 30, and a control unit 40. The control unit 40 controls the two imaging devices 10 and 20, and the signal processing unit 30.

[Imaging Device 10]

The imaging device 10 includes, for example, an imaging element 11 and an optical lens 12. The optical lens 12 allows object light L1 to converge and to enter a light-entering surface of the imaging element 11. The optical lens 12 is, for example, fixed in the imaging device 10. At this occasion, a focal distance of the imaging device 10 is fixed at a constant value. The imaging device 10 may further include, for example, an iris and a variable optical LPF, on side on which the light-entering surface of the imaging element 11 is disposed. Description of the imaging element 11 is given later.

[Imaging Device 20]

The imaging device 20 includes, for example, an imaging element 21 and an optical lens 22. The optical lens 12 allows object light L2 to converge and to enter a light-entering surface of the imaging element 21. The optical lens 22 is, for example, fixed in the imaging device 20. At this occasion, a focal distance of the imaging device 20 is fixed at a constant value. The imaging device 20 may further include, for example, an iris and a variable optical LPF, on side on which the light-entering surface of the imaging element 21 is disposed.

[Imaging Elements 11 and 21]

Description is given next of the imaging elements 11 and 21. The imaging elements 11 and 21 include, for example, a light-receiving unit and a color filter array. The light-receiving unit includes a plurality of photoelectric conversion elements that are two-dimensionally disposed at predetermined intervals. The color filter array is disposed on a light-entering surface of the light-receiving unit. The imaging elements 11 and 21 are single-plate solid-state imaging elements, and are constituted by, for example, single-plate CCD (charge Coupled Device) image sensors or single-plate CMOS (Complementary Metal-Oxide Semiconductor) image sensors. In the imaging elements 11 and 21, the color filter array has, for example, a Bayer array including an RGB array, as illustrated in FIG. 4. It is to be noted that the color filter array may have, for example, an RGBW array, or an array such as Y (yellow), C (cyan), and M (magenta). It is to be noted that in the following, description is given with an example case where the color filter array has the Bayer array including the RGB array.

The imaging elements 11 and 21 make a discrete sampling of the object light L1 and L2 entering through, for example, the optical lenses 12 and 22, with the light-receiving unit and the color filter array. Thus the imaging elements 11 and 21 generate the RAW data Iraw1 and Iraw2. The imaging element 11 generates the RAW data Iraw1 of the relatively wide angle of view. For example, the RAW data Iraw1 of the relatively wide angle of view is obtained, by relatively shortening the focal distance of the imaging device 10. The imaging device 20 generates the RAW data Iraw2 of the narrower angle of view than that of the RAW data Iraw1. For example, the RAW data Iraw2 of the relatively narrow angle of view is obtained, by relatively lengthening the focal distance of the imaging device 10.

Each of the RAW data Iraw1 and Iraw2 is mosaic data in which any one kind of color information out of a plurality of kinds of color information included in the color filter array is set per each pixel. In a case where the color filter array has the Bayer array including the RGB array, each of the RAW data Iraw1 and Iraw2 is mosaic data in which any one kind of color information out of red color information, green color information, and blue color information included in the color filter array is set per each pixel. Generating color image data Icol from the RAW data Iraw1 and Iraw2 involves demosaic processing that includes generating, from the RAW data Iraw1 and Iraw2, all color information for all pixels. In this embodiment, composition is performed in the RAW data Iraw1 and Iraw2 before the demosaic processing is performed. Detailed description of the composition of the RAW data Iraw1 and Iraw2 is given later.

[Signal Processing Unit 30]

Description is given next of the signal processing unit 30. The signal processing unit 30 includes, for example, a composition processing unit 31 and a camera signal processing unit 32, as illustrated in FIG. 3. The composition processing unit 31 generates composite RAW data Iraw, by performing the composition of the two pieces of the RAW data Iraw1 and Iraw2 with each other. The two pieces of the RAW data Iraw1 and Iraw2 are generated by the respective imaging devices 10 and 20. The camera signal processing unit 32 performs the demosaic processing on the composite RAW data Iraw generated in the composition processing unit 31, and thereby generate the color image data Icol. The color image data Icol is so constituted as to include, per each pixel, all kinds of the color information included in the color filter array. In the case where the color filter array includes the RGB Bayer array, the color image data Icol is so constituted as to include, per each pixel, RGB color information, for example.

FIG. 5 illustrates one example of a concept of signal processing in the composition processing unit 31. In FIG. 5, description is simplified because of relations with priority to understandability of the signal processing in the composition processing unit 31. Accordingly, in FIG. 5, used are different reference characters from the forgoing reference characters.

The composition processing unit 31 acquires wide image data Iwide from the imaging device 10, and acquires tele image data Itele from the imaging device 20. In the tele image data Itele, an angle of view is smaller than that of the wide image data Iwide. The tele image data Itele corresponds to a predetermined region α other than an outer edge of the wide image data Iwide. The composition processing unit 31 sets the predetermined region α, on the basis of magnification of the imaging devices 10 and 20, and on the basis of image sizes of the wide image data Iwide and the tele image data Itele.

The composition processing unit 31 segments the predetermined region α from the wide image data Iwide, to generate wide image data Iwide'. The composition processing unit 31 reduces the tele image data Itele, on the basis of the magnification of the imaging devices 10 and 20, to generate tele image data Itele'. The composition processing unit 31 performs composition of the wide image data Iwide' and the tele image data Itele' with each other, to generate composite image data Ifusion. Assume that the magnification of the imaging device 10 is 1, and the magnification of the imaging device 20 is 2. At this occasion, for example, in a case where magnification specified by a user is 1, the composition processing unit 31 outputs the wide image data Iwide as the composite RAW data Iraw. For example, in a case where the magnification specified by the user is 2 or more, the composition processing unit 31 outputs, as the composite RAW data Iraw, what is obtained by enlarging the tele image data Itele with the magnification specified by the user. For example, in a case where the magnification specified by the user is 1 to 2, the composition processing unit 31 outputs, as the composite RAW data Iraw, what is obtained by replacing the predetermined region α, in the wide image data Iwide, with the composite image data Ifusion (composite image data Imerge).

It is to be noted that in reality, the wide image data Iwide' and the tele image data Itele' sometimes include positional deviation caused by parallax, and differences in sensitivity and differences in exposure between the imaging devices 10 and 20. The composite image data Ifusion sometimes include a high-frequency component that is higher than Nyquist frequencies of the imaging devices 10 and 20. Originally, the wide image data Iwide' and the tele image data Itele' are the mosaic data. Accordingly, in order to perform the precise composition of the wide image data Iwide' and the tele image data Itele' with each other, it is preferable that pixel interpolation be carried out with respect to the wide image data Iwide' and the tele image data Itele'. It is therefore preferable that the composition processing unit 31 perform the following various kinds of signal processing on the wide image data Iwide' and the tele image data Itele'.

FIG. 6 illustrates one example of functional blocks of the composition processing unit 31. FIG. 7 illustrates one example of a signal processing procedure in the composition processing unit 31.

The composition processing unit 31 includes an alignment unit 130 and a composition unit 140. The alignment unit 130 generates alignment data of the two pieces of the RAW data Iraw1 and Iraw2, on the basis of the two pieces of the RAW data Iraw1 and Iraw2 generated by the respective imaging devices 10 and 20. The composition unit 140 performs the composition of the two pieces of the RAW data Iraw1 and Iraw2 with each other, on the basis of the alignment data generated by the alignment unit 130.

The alignment unit 130 includes, for example, a segmentation unit 131, a gain correction unit 132, pixel correction units 133 and 134, a reduction unit 135, and a parallax calculation unit 136.

The segmentation unit 131 specifies a fusion region β (corresponding to the region α in FIG. 5) in the RAW data Iraw1. The fusion region β is a region to be subjected to the composition with the RAW data Iraw2. Specifically, the segmentation unit 131 specifies the fusion region β, on the basis of the magnification of the imaging devices 10 and 20, and on the basis of the image sizes of the RAW data Iraw1 and Iraw2. For example, the segmentation unit 131 specifies coordinates of the fusion region β in the RAW data Iraw1, on the basis of the magnification of the imaging devices 10 and 20, and on the basis of the image sizes of the RAW data Iraw1 and Iraw2. For example, on the basis of the coordinates specified, the segmentation unit 131 segments, from the RAW data Iraw1, RAW data Iraw1a corresponding to the fusion region β (step S101).

It is to be noted that the composition processing unit 31 may perform OPB (Optical Black) subtraction with respect to the RAW data Iraw1a and the RAW data Iraw2. The OPB subtraction refers to exclusion of a noise component caused by, for example, a dark current. For example, the composition processing unit 31 may exclude, from the RAW data Iraw1a and Iraw2, a noise component caused in a case where the imaging devices 10 and 20 are shielded against light. At this occasion, in a case where the exclusion of the noise component causes presence of a pixel a value of which becomes negative in the RAW data Iraw1a and Iraw2, the composition processing unit 31 stores coordinates of the relevant pixel.

The gain correction unit 132 calculates a gain ratio (e.g., an RGB gain ratio) per each color information in the RAW data Iraw1a and Iraw2. For example, the gain correction unit 132 calculates, per each color information, an average value in the RAW data Iraw1a, and calculates, per each color information, an average value in the RAW data Iraw2. For example, the gain correction unit 132 calculates, per each color information, a correction gain from a ratio of the average values per each color information, in the RAW data Iraw1a and Iraw2. On the basis of the correction gain calculated, the gain correction unit 132 corrects the RAW data Iraw2 (step S102), and thereby generates RAW data Iraw2a.

The pixel correction unit 133 performs interpolation of all the pixels included in the RAW data Iraw1a, on the basis of a predetermined kind of the color information (e.g., the green color information) included in the RAW data Iraw1a. Thus, the pixel correction unit 133 generates, as the alignment data, interpolated RAW data Iraw1b (step S103). The interpolated RAW data Iraw1b includes the predetermined kind of the color information (e.g., the green color information). The pixel correction unit 134 performs interpolation of all the pixels included in the RAW data Iraw2a, on the basis of a predetermined kind of the color information (e.g., the green color information) included in the RAW data Iraw2a. Thus, the pixel correction unit 134 generates, as the alignment data, interpolated RAW data Iraw2b. The interpolated RAW data Iraw2b includes the predetermined kind of the color information (e.g., the green color information).

For example, as illustrated in FIG. 8, the pixel correction unit 133 generates the interpolated RAW data Iraw1b from the RAW data Iraw1a including the Bayer array including the RGB array. The interpolated RAW data Iraw1b includes the green color information. Furthermore, for example, as illustrated in FIG. 8, the pixel correction unit 133 generates the interpolated RAW data Iraw2b from the RAW data Iraw2a including the Bayer array including the RGB array. The interpolated RAW data Iraw2b includes the green color information. At this occasion, with a center pixel (a pixel as a target of the interpolation) being a G pixel, the pixel correction unit 133 corrects the green color information of the center pixel, with the use of, for example, an interpolation filter F as illustrated in FIG. 9. Moreover, with the center pixel (the pixel as the target of the interpolation) being an R pixel or a B pixel, the pixel correction unit 133 replaces the color information of the center pixel with green color information generated with the use of, for example, an interpolation filter F as illustrated in FIG. 10.

The reduction unit 135 reduces the interpolated RAW data Iraw2b on the basis of the magnification of the imaging devices 10 and 20 (step S104). The parallax calculation unit 136 calculates parallax information Disp as the alignment data, on the basis of the interpolated RAW data Iraw1b and Iraw2c (step s105). The parallax information Disp corresponds to an amount of positional deviation on an image caused by positional inconsistency of the imaging devices 10 and 20 with each other. For example, the parallax calculation unit 136 generates the parallax information Disp from the interpolated RAW data Iraw1b and Iraw2c, with the use of, for example, a motion vector estimation method between two images.

The composition unit 140 includes, for example, a fusion unit 141, an LPF unit 142, a correlation processing unit 143, a merge unit 144, and a selection unit 145.

The fusion unit 141 generates composite RAW data Iraw3a, by performing composition of the two pieces of the interpolated RAW data Iraw1b and Iraw2c (step S106). Specifically, the fusion unit 141 generates the composite RAW data Iraw3a, by performing the composition of the two pieces of the interpolated RAW data Iraw1b and Iraw2c on the basis of the parallax information Disp.

FIG. 11 illustrates one example in outline of a signal processing procedure in the fusion unit 141. The fusion unit 141 determines whether or not a high-frequency component Iraw2c_H of the interpolated RAW data Iraw2c of a relatively narrow angle of view is larger than a high-frequency component Iraw1b_H of the interpolated RAW data Iraw1b of a relatively wide angle of view (step S201). As a result, in a case where the high-frequency component Iraw2c_H of the interpolated RAW data Iraw2c is larger than the high-frequency component Iraw1b_H of the interpolated RAW data Iraw1b, the fusion unit 141 generates the composite RAW data Iraw3a (second composite imaging data), by adding together a low-frequency component Iraw1b_L of the interpolated RAW data Iraw1b and the high-frequency component Iraw2c_H of the interpolated RAW data Iraw2c (step S202). For example, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c, in each of pixels in which the high-frequency component Iraw2c_H of the interpolated RAW data Iraw2c is larger than the high-frequency component Iraw1b_H of the interpolated RAW data Iraw1b.

In a case where the high-frequency component Iraw2c_H of the interpolated RAW data Iraw2c is equal to the high-frequency component Iraw1b_H of the interpolated RAW data Iraw1b, the fusion unit 141 generates the composite RAW data Iraw3a, by adding together, for example, the low-frequency component Iraw1b_L of the interpolated RAW data Iraw1b and the high-frequency component Iraw2c_H of the interpolated RAW data Iraw2c (step S202). For example, the fusion unit 141 generates the composite RAW data Iraw3a, by adding together, for example, the low-frequency component Iraw1b_L of the interpolated RAW data Iraw1b and the high-frequency component Iraw2c_H of the interpolated RAW data Iraw2c, in each of pixels in which the high-frequency component Iraw2c_H of the interpolated RAW data Iraw2c is equal to the high-frequency component Iraw1b_H of the interpolated RAW data Iraw1b.

In a case where the high-frequency component Iraw2c_H of the interpolated RAW data Iraw2c is smaller than the high-frequency component Iraw1b_H of the interpolated RAW data Iraw1b, the fusion unit 141 generates the composite RAW data Iraw3a (first composite imaging data), by adding together the low-frequency component Iraw1b_L of the interpolated RAW data Iraw1b, the high-frequency component Iraw1b_H of the interpolated RAW data Iraw1b, and the high-frequency component Iraw2c_H of the interpolated RAW data Iraw2c (step S203). For example, the fusion unit 141 generates the composite RAW data Iraw3a, by adding together the low-frequency component Iraw1b_L of the interpolated RAW data Iraw1b, the high-frequency component Iraw1b_H of the interpolated RAW data Iraw1b, and the high-frequency component Iraw2c_H of the interpolated RAW data Iraw2c, in each of pixels in which the high-frequency component Iraw2c_H of the interpolated RAW data Iraw2c is smaller than the high-frequency component Iraw1b_H of the interpolated RAW data Iraw1b.

FIG. 12 illustrates one example of an internal configuration of the fusion unit 141. The fusion unit 141 includes, for example, an LPF unit 141A, an HPF 141B, a parallax correction unit 141C, a blur correction unit 141D, and a superimposition unit 141E. The LPF unit 141A generates interpolated RAW data Iraw1c, by extracting the low-frequency component in the interpolated RAW data Iraw1b. The HPF 141B generates interpolated RAW data Iraw2d, by extracting the high-frequency component in the interpolated RAW data Iraw2c. The parallax correction unit 141C generates interpolated RAW data Iraw2e, by correcting the interpolated RAW data Iraw2*d* on the basis of the parallax information Disp. The blur correction unit 141D generates interpolated RAW data Iraw4, on the basis of the interpolated RAW data Iraw1*b* and on the basis of the interpolated RAW data Iraw2*e*. The superimposition unit 141E generates the composite RAW data Iraw3*a*, by adding the interpolated RAW data Iraw4 to the interpolated RAW data Iraw1*c*.

The interpolated RAW data Iraw4 corresponds to the high-frequency component Iraw2*c*_H of the interpolated RAW data Iraw2*c*, or to what is obtained by adding together the high-frequency component Iraw1*b*_H of the interpolated RAW data Iraw1*b* and the high-frequency component Iraw2*c*_H of the interpolated RAW data Iraw2*c*. In a case where the high-frequency component Iraw2*c*_H of the interpolated RAW data Iraw2*c* is larger than the high-frequency component Iraw1*b*_H of the interpolated RAW data Iraw1*b*, the interpolated RAW data Iraw4 corresponds to the high-frequency component Iraw2*c*_H of the interpolated RAW data Iraw2*c*. In a case where the high-frequency component Iraw2*c*_H of the interpolated RAW data Iraw2*c* is smaller than the high-frequency component Iraw1*b*_H of the interpolated RAW data Iraw1*b*, the interpolated RAW data Iraw4 corresponds to what is obtained by adding together the high-frequency component Iraw1*b*_H of the interpolated RAW data Iraw1*b* and the high-frequency component Iraw2*c*_H of the interpolated RAW data Iraw2*c*.

The blur correction unit 141D includes, for example, an HPF unit 141F, absolute value processing units 141G and 141H, a map creation unit 141J and a selection unit 141M.

The HPF unit 141F generates interpolated RAW data Iraw1*d*, by extracting the high-frequency component in the interpolated RAW data Iraw1*b*. The absolute value processing unit 141G generates interpolated RAW data Iraw1*e*, by re-writing a sign of each data included in the interpolated RAW data Iraw1*d* as plus. The absolute value processing unit 141H generates interpolated RAW data Iraw2*f*, by re-writing a sign of each data included in the interpolated RAW data Iraw2*e* as plus. The map creation unit 141J generates a map Imap1 on the basis of the interpolated RAW data Iraw1*e* and on the basis of the interpolated RAW data Iraw2*f*. The selection unit 141M generates the interpolated RAW data Iraw4 on the basis of the interpolated RAW data Iraw1*d*, on the basis of the interpolated RAW data Iraw2*e*, and on the basis of the map Imap1.

FIG. 13 illustrates one example of a map creation procedure in the map creation unit 141J. It is to be noted that N in FIG. 13 is an upper limit value of x in the interpolated RAW data Iraw1*e* (x,y) and the interpolated RAW data Iraw2*f* (x,y). M in FIG. 13 is an upper limit of y in the interpolated RAW data Iraw1*e* (x,y) and the interpolated RAW data Iraw2*f* (x,y).

The map creation unit 141J creates a map that makes a selection as to whether or not to use, in the composition, the high-frequency component Iraw1*b*_H of the interpolated RAW data Iraw1*b* (the interpolated RAW data Iraw1*d*). The map creation unit 141J sets x=0 and y=1 in the interpolated RAW data Iraw1*e* (x,y) and Iraw2*f* (x,y) (step S301). Thereafter, the map creation unit 141J adds 1 to x (step S302). Thereafter, the map creation unit 141J determines whether or not x is larger than N (step S303). As a result, in a case where x is not larger than N, the map creation unit 141J determines whether or not the interpolated RAW data Iraw2*f* (x,y) is equal to or larger than the interpolated RAW data Iraw1*e* (x,y), at the x and y coordinates set (step S304). As a result, in a case where the interpolated RAW data Iraw2*f* (x,y) is equal to or larger than the interpolated RAW data Iraw1*e* (x,y), the map creation unit 141J writes 0 in the map Imap1 (x,y), at the x and y coordinates set (step S305). In a case where the interpolated RAW data Iraw2*f*(x,y) is smaller than the interpolated RAW data Iraw1*e* (x,y), the map creation unit 141J writes 1 in the map Imap1 (x,y), at the x and y coordinates set (step S306). The map creation unit 141J executes steps S305 and S306, and thereafter, returns to step S302.

In step S303, in a case where x is larger than N, the map creation unit 141J determines whether or not y is larger than M (step S307). As a result, in a case where y is larger than M, the map creation unit 141J ends creation of the map Imap1 (x,y). In a case where y is not larger than M, the map creation unit 141J adds 1 to y, while bringing x to 0, and returns to step S302 (step S308). The map creation unit 141J repetitively performs steps S302 to S208 at all coordinates of an M×N matrix, and thereby creates the map Imap1 (x,y).

FIG. 14 illustrates one example of a selection procedure of fusion target data in the selection unit 141M. It is to be noted that N in FIG. 14 is an upper limit value of x in the map Imap1 (x,y). M in FIG. 14 is an upper limit of y in the map Imap1 (x,y).

The selection unit 141M generates the interpolated RAW data Iraw4, by selecting, per each pixel, data to be added to the low-frequency component of the interpolated RAW data Iraw1*b*, from the high-frequency component of the interpolated RAW data Iraw1*b* (the interpolated RAW data Iraw1*d*) and the high-frequency component of the interpolated RAW data Iraw2*c* (the interpolated RAW data Iraw2*e*). The selection unit 141M sets x=0 and y=1 in the interpolated RAW data Iraw1*d* (x,y), the interpolated RAW data Iraw2*e* (x,y), and the map Imap1 (x,y) (step S401). Thereafter, the selection unit 141M adds 1 to x (step S402). Thereafter, the selection unit 141M determines whether or not x is larger than N (step S403). As a result, in a case where x is not larger than N, the selection unit 141M adds together, at the x and y coordinates set, what is obtained by multiplying together the interpolated RAW data Iraw1*d* (x,y) and the map Imap1 (x,y), and the interpolated RAW data Iraw2*e* (x,y) (step S404). After executing step S404, the selection unit 141M returns to step S402. In a case where x is larger than N, the selection unit 141M determines whether or not y is larger than M (step S405). As a result, in a case where y is larger than M, the selection unit 141M ends creation of the interpolated RAW data Iraw4 (x,y). In a case where y is not larger than M, the selection unit 141M adds 1 to y, while bringing x to 0, and returns to step S402 (step S406). The selection unit 141M repetitively performs steps S402 to S406 at all the coordinates of the M×N matrix, and thereby creates the interpolated RAW data Iraw4 (x,y).

It is to be noted that for example, the fusion unit 141 may include a map processing unit that performs map processing on the interpolated RAW data Iraw4 in adding the interpolated RAW data Iraw4 to the interpolated RAW data Iraw1*c*. As the map, for example, on the basis of a fusion result, an input signal, and the parallax information Disp, detection is made of a location where the fusion is likely to fail, to generate fusion reliability. Reducing a fusion effect of the low-reliability location with the use of this map makes it possible to allow a failure in the fusion to be hard to detect in a final result. Moreover, the map may be also utilized for purposes of smoothing a change in resolution at a border between the RAW data Iraw3*c* and the RAW data Iraw1, in a case where the composition of the RAW data Iraw3*c* and the RAW data Iraw1 with each other has been performed. The RAW data Iraw3*c* is generated by the correlation processing unit 143 described later. In this case, a shape of the map has a shape that reduces stepwise the fusion effect as is closer to an outer edge of composite data.

The LPF unit 142 generates the composite RAW data Iraw3b, by attenuating a high-frequency component that is included in the composite RAW data Iraw3a and is larger than the Nyquist frequencies of the respective imaging devices 10 and 20 (step S107). This leads to suppression of occurrence of false color. FIG. 15 illustrates one example of an internal configuration of the LPF unit 142. The LPF unit 142 has a configuration in which, for example, a plurality of LPFs that differ in cut-off frequency from one another are disposed side-by-side. The LPF unit 142 includes, for example, a first path P1, a second path P2, and a third path P3. The first path P1 includes an LPF 142A and a gain unit 142D that are coupled in series. The second path P2 includes an LPF 142B and a gain unit 142E that are coupled in series. In the third path P3, solely a gain unit 142C is provided. For example, as illustrated in FIG. 16, the LPF 142A has, as a cut-off frequency, a Nyquist frequency Nyq1 of the imaging device 10, and has a filter characteristic in which an attenuation rate increases as is closer to the cut-off frequency. For example, as illustrated in FIG. 17, the LPF 142B has, as a cut-off frequency, a frequency between the Nyquist frequency Nyq1 of the imaging device 10 and a Nyquist frequency Nyq2 of the imaging device 20, and has a filter characteristic in which the attenuation rate increases as is closer to the cut-off frequency. Thus, in the LPF unit 142, making a selection from the LPF units 142A and 142B makes it possible to adjust strength and weakness with respect to the attenuation of a high band.

The first path P1, the second path P2, and the third path P3 are coupled in parallel to one another. The LPF unit 142 is configured to allow gains of the respective gain units 142C, 142D, and 142E to be set independently from one another, in accordance with a control signal from the control unit 40. Accordingly, for example, in a case where the control signal is inputted to the LPF unit 142, so as to bring the gains of the gain units 142C and 142D to 0 and to bring the gain of the gain unit 142E to 1, the LPF unit 142 functions as the LPF unit 142B. Moreover, for example, in a case where the control signal is inputted to the LPF unit 142, so as to bring the gain of the gain unit 142C to 0 and to bring the gains of the gain units 142D and 142E to 1, the LPF unit 142 functions as the LPF units 142A and 142B disposed side-by-side.

The correlation processing unit 143 performs correlation processing on the composite RAW data Iraw3a, or on what is obtained by performing predetermined processing on the composite RAW data Iraw3a (the composite RAW data Iraw3b) (step S108). The correlation processing unit 143 adds a color difference component (Iraw1-Iraw1b) to the composite RAW data Iraw3a or the composite RAW data Iraw3b. The color difference component is a difference between the RAW data Iraw1 and the interpolated RAW data Iraw1b. A color ratio may be also used in the correlation processing. For example, as illustrated in FIG. 18B, the correlation processing unit 143 may multiply the composite RAW data Iraw3a or the composite RAW data Iraw3b by a color ratio component (Iraw1/Iraw1b). The color ratio component is a ratio of the RAW data Iraw1 to the interpolated RAW data Iraw1b. Thus, the correlation processing unit 143 generates the RAW data Iraw3c having an array that corresponds to the array of the RAW data Iraw1 and Iraw2.

The merge unit 144 generates RAW data Iraw3d (fourth RAW data) for the demosaic processing, by performing composition of RAW data Irawa1 and the RAW data Iraw3c with each other (step S109). At this occasion, the merge unit 144 adjusts an image size of the RAW data Iraw3c to an image size of the RAW data Irawa1, by providing, for example, a frame-shaped region the color information of which is zero, in a periphery of the RAW data Iraw3c. Thereafter, for example, the merge unit 144 brings the color information of the fusion region α out of the RAW data Irawa1 to zero. Furthermore, for example, the merge unit 144 adds, to the RAW data Irawa1, the RAW data Iraw3c adjusted to the image size of the RAW data Irawa1. In other words, for example, the merge unit 144 replaces the fusion region α out of the RAW data Irawa1 with the RAW data Iraw3c.

It is to be noted that in a case where the composition processing unit 31 has performed the OPB subtraction, the merge unit 144 may add, before performing the composition processing, the noise component excluded by the OPB subtraction, to the RAW data Iraw3c, in consideration of a sign as well.

The selection unit 145 selects the composite RAW data Iraw to be outputted, in accordance with the magnification specified by the user. Assume that the magnification of the imaging device 10 is 1, and the magnification of the imaging device 20 is 2. At this occasion, for example, in a case where the magnification specified by the user is 1, the selection unit 145 outputs the RAW data Iraw1 as the composite RAW data Iraw. For example, in a case where the magnification specified by the user is 2 or more, the composition processing unit 31 outputs, as the composite RAW data Iraw, what is obtained by enlarging the RAW data Iraw2 with the magnification specified by the user. For example, in a case where the magnification specified by the user is 1 to 2, the composition processing unit 31 outputs the RAW data Iraw3d as the composite RAW data Iraw.

[Effects]

Described next are effects of the imaging apparatus 1.

Proposals have been previously made for an imaging system that captures an image of a wide visual field and high resolution, with the use of two imaging devices. In the existing imaging system, for example, in imaging data of a relatively wide angle of view, replacing a high-frequency component with a high-frequency component in imaging data of a relatively narrow angle of view makes it possible to obtain the image of the wide visual field and the high resolution. In the existing imaging system, however, the imaging data of the relatively narrow angle of view includes a blur. Accordingly, in the imaging data of the relatively wide angle of view, replacement of the high-frequency component with the high-frequency component of the imaging data of the relatively narrow angle of view only results in possibility of lowered resolution.

Meanwhile, in this embodiment, the composite RAW data Iraw3a is generated, by adding together the low-frequency component Iraw1b_L of the interpolated RAW data Iraw1b of the relatively wide angle of view, the high-frequency component Iraw1b_H of the interpolated RAW data Iraw1b of the relatively wide angle of view, and the high-frequency component Iraw2c_H of the interpolated RAW data Iraw2c of the relatively narrow angle of view. Thus, with the interpolated RAW data Iraw2c including a blur, it is possible to alleviate the influences of the blur, as compared to a case where in the interpolated RAW data Iraw1b of the relatively wide angle of view, the high-frequency component is replaced with the high-frequency component of the interpolated RAW data Iraw2c of the relatively narrow angle of view. Hence, it is possible to avoid lowered resolution caused by image composition, in a simple method.

Moreover, in this embodiment, the composite RAW data Iraw3a is generated, by adding together the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is larger than the high-frequency component Iraw1b_H of the interpolated RAW data Iraw1b. At this occasion, the high-frequency component Iraw2c_H of the interpolated RAW data Iraw2c is devoid of the blur that influences the composition. Hence, it is possible to obtain the image of the wide visual field and the high resolution.

Moreover, in this embodiment, the composite RAW data Iraw3a is generated, by adding together the low-frequency component Iraw1b_L of the interpolated RAW data Iraw1b, the high-frequency component Iraw1b_H of the interpolated RAW data Iraw1b, and the high-frequency component Iraw2c_H of the interpolated RAW data Iraw2c, in each of the pixels in which the high-frequency component Iraw2c_H of the interpolated RAW data Iraw2c is smaller than the high-frequency component Iraw1b_H of the interpolated RAW data Iraw1b. At this occasion, it is estimated that the high-frequency Iraw2c_H of the interpolated RAW data Iraw2c includes the blur that influences the composition. However, the high-frequency component Iraw1b_H of the interpolated RAW data Iraw1b is also used in the composition. This makes it possible to reduce the influences by the blur presence of which in the high-frequency component Iraw2c_H of the interpolated RAW data Iraw2c is estimated. Hence, it is possible to avoid the lowered resolution caused by the image composition, in the simple method.

Moreover, in this embodiment, the region other than the outer periphery of the imaging region R1 of the imaging device 10 may serve as the imaging region R2 of the imaging device 20. Furthermore, in this embodiment, the RAW data Iraw1 of the relatively wide angle of view and the RAW data Iraw2 of the narrower angle of view than that of the RAW data Iraw1 are generated by the imaging devices 10 and 20. Thus, performed is the composition of the predetermined region (the fusion region β) other than the outer periphery of the composite RAW data Iraw, and the RAW data Iraw2 with each other. In other words, the RAW data Iraw2 is fitted in the frame-like RAW data Iraw1. As a result, with the use of the two imaging devices 10 and 20, it is possible to obtain an image of a wide angle of view and high resolution, and/or to perform optical zooming without using a mechanical zooming mechanism.

Moreover, in this embodiment, the interpolation of all the pixels included in the RAW data Iraw1 and Iraw2 is performed on the basis of the predetermined kind of the color information included in the RAW data Iraw1 and Iraw2. Hence, it is possible to perform the composition processing at a same level of precision as that of a case where the composition processing is performed after the demosaic processing is performed on the RAW data Iraw1 and Iraw2.

Moreover, in this embodiment, the parallax information Disp as the alignment information is generated on the basis of the two pieces of the interpolated RAW data Iraw1b and Iraw 2b generated from the two pieces of the RAW data Iraw1 and Iraw2. Hence, the use of the parallax information Disp makes it possible to enhance precision in the composition of the interpolated RAW data Iraw1b and the interpolated RAW data Iraw2c.

Moreover, in this embodiment, attenuated by the LPF 142 is the high-frequency component that is included in the composite RAW data Iraw3a and is larger than the Nyquist frequencies of the respective imaging devices 10 and 20. Hence, it is possible to suppress the occurrence of the false color, in a case where the composition of the RAW data Iraw a1 and the RAW data Iraw3c with each other is performed. Furthermore, in this embodiment, the LPF unit 142A and the LPF 142B are arranged side-by-side, and it is possible to select any one from the LPF unit 142A and the LPF 142B. Thus, making the selection from the LPF unit 142A and the LPF 142B makes it possible to adjust the strength and the weakness with respect to the attenuation of the high band.

Moreover, in this embodiment, the color difference component (Iraw1-Iraw1b) is added to the composite RAW data Iraw3c, or to what is obtained by performing the predetermined processing on the composite RAW data Iraw3a (the composite RAW data Iraw3b). Thus, in this embodiment, the composition processing is performed while reducing the color information, and thereafter, the color information lost is restored to the composite RAW data Iraw3c or the composite RAW data Iraw3b. Hence, in this embodiment, it is possible to enhance the precision in the composition, while reducing processing costs and power consumption involved in the composition processing.

Moreover, in this embodiment, the demosaic processing is performed on the RAW data Iraw3d generated by performing the composition of the RAW data Iraw1 and the RAW data Iraw3c with each other. Thus, in this embodiment, the demosaic processing is performed after the composition based on the RAW data is performed. Hence, it is possible to reduce the processing costs and the power consumption, as compared to a case where the composition is performed after the demosaic processing is performed.

2. Modification Example of First Embodiment

Description is given next of modification examples of the imaging apparatus 1 according to the forgoing embodiment.

Modification Example A

FIG. 19 illustrates one example in outline of a signal processing procedure in the fusion unit 141 according to this modification example. The fusion unit 141 determines whether or not the high-frequency component Iraw2c_H of the interpolated RAW data Iraw2c of the relatively narrow angle of view is larger than the high-frequency component Iraw1b_H of the interpolated RAW data Iraw1b of the relatively wide angle of view (step S201). As a result, in a case where the high-frequency component Iraw2c_H of the interpolated RAW data Iraw2c is larger than the high-frequency component Iraw1b_H of the interpolated RAW data Iraw1b, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c (step S202). For example, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is larger than the high-frequency component Iraw1b_H of the interpolated RAW data Iraw1b.

In a case where the high-frequency component Iraw2c_H of the interpolated RAW data Iraw2c is equal to the high-frequency component Iraw1b_H of the interpolated RAW data Iraw1b, the fusion unit 141 generates the composite RAW data Iraw3*a*, by adding together, for example, the low-frequency component Iraw1*b*_L of the interpolated RAW data Iraw1*b* and the high-frequency component Iraw2*c*_H of the interpolated RAW data Iraw2*c* (step S202). For example, the fusion unit 141 generates the composite RAW data Iraw3*a*, by adding together, for example, the low-frequency component Iraw1*b*_L of the interpolated RAW data Iraw1*b* and the high-frequency component Iraw2*c*_H of the interpolated RAW data Iraw2*c*, in each of the pixels in which the high-frequency component Iraw2*c*_H of the interpolated RAW data Iraw2*c* is equal to the high-frequency component Iraw1*b*_H of the interpolated RAW data Iraw1*b*.

In a case where the high-frequency component Iraw2*c*_H of the interpolated RAW data Iraw2*c* is smaller than the high-frequency component Iraw1*b*_H of the interpolated RAW data Iraw1*b*, the fusion unit 141 generates the composite RAW data Iraw3*a*, by adding together the low-frequency component Iraw1*b*_L of the interpolated RAW data Iraw1*b* and the high-frequency component Iraw1*b*_H of the interpolated RAW data Iraw1*b* (step S204). For example, the fusion unit 141 generates the composite RAW data Iraw3*a*, by adding together the low-frequency component Iraw1*b*_L of the interpolated RAW data Iraw1*b* and the high-frequency component Iraw1*b*_H of the interpolated RAW data Iraw1*b*, in each of the pixels in which the high-frequency component Iraw2*c*_H of the interpolated RAW data Iraw2*c* is smaller than the high-frequency component Iraw1*b*_H of the interpolated RAW data Iraw1*b*.

FIG. 20 illustrates one example of an internal configuration of the fusion unit 141 according to this modification example. The fusion unit 141 includes, for example, the LPF unit 141A, the HPF 141B, the parallax correction unit 141C, the blur correction unit 141D, and the superimposition unit 141E. In this modification example, the map creation unit 141J creates the map Imap1 for a selection of any one from the interpolated RAW data Iraw1*d* and the interpolated RAW data Iraw2*e*. The selection unit 141M generates the interpolated RAW data Iraw4, by selecting any one from the interpolated RAW data Iraw1*d* and the interpolated RAW data Iraw2*e*, on the basis of the map Imap1.

FIG. 21 illustrates one example of a map creation procedure in the map creation unit 141J. It is to be noted that N in FIG. 21 is an upper limit value of x in the interpolated RAW data Iraw1*e* (x,y) and the interpolated RAW data Iraw2*f* (x,y). M in FIG. 21 is an upper limit value of y in the interpolated RAW data Iraw1*e* (x,y) and the interpolated RAW data Iraw2*f* (x,y).

The map creation unit 141J creates a map that makes a selection as to whether or not to use, in the composition, the high-frequency component Iraw1*b*_H of the interpolated RAW data Iraw1*b* (the interpolated RAW data Iraw1*d*). The map creation unit 141J sets x=0 and y=1 in the interpolated RAW data Iraw1*e* (x,y) and Iraw2*f* (x,y) (step S301). Thereafter, the map creation unit 141J adds 1 to x (step S302). Thereafter, the map creation unit 141J determines whether or not x is larger than N (step S303). As a result, in a case where x is not larger than N, the map creation unit 141J determines whether or not the interpolated RAW data Iraw2*f* (x,y) is equal to or larger than the interpolated RAW data Iraw1*e* (x,y), at the x and y coordinates set (step S304). As a result, in a case where the interpolated RAW data Iraw2*f* (x,y) is equal to or larger than the interpolated RAW data Iraw1*e* (x,y), the map creation unit 141J writes true in the map Imap1 (x,y), at the x and y coordinates set (step S309). In a case where the interpolated RAW data Iraw2*f* (x,y) is smaller than the interpolated RAW data Iraw1*e* (x,y), the map creation unit 141J writes false in the map Imap1 (x,y), at the x and y coordinates set (step S310). After executing steps S309 and S310, the map creation unit 141J returns to step S302.

In step S303, in a case where x is larger than N, the map creation unit 141J determines whether or not y is larger than M (step S307). As a result, in a case where y is larger than M, the map creation unit 141J ends the creation of the map Imap1 (x,y). In a case where y is not larger than M, the map creation unit 141J adds 1 to y, while bringing x to 0, and returns to step S302 (step S308). The map creation unit 141J repetitively performs steps S302 to S308 at all the coordinates of the M×N matrix, and thereby creates the map Imap1 (x,y).

FIG. 22 illustrates one example of a selection procedure of fusion target data in the selection unit 141M. It is to be noted that N in FIG. 22 is an upper limit value of x in the map Imap1 (x,y). M in FIG. 22 is an upper limit value of y in the map Imap1 (x,y).

The selection unit 141M generates the interpolated RAW data Iraw4, by selecting, per each pixel, data to be added to the low-frequency component of the interpolated RAW data Iraw1*b*, from the high-frequency component of the interpolated RAW data Iraw1*b* (the interpolated RAW data Iraw1*d*) and the high-frequency component of the interpolated RAW data Iraw2*c* (the interpolated RAW data Iraw2*e*). The selection unit 141M sets x=0 and y=1 in the interpolated RAW data Iraw1*d* (x,y), the interpolated RAW data Iraw2*e* (x,y), and the map Imap1 (x,y) (step S401). Thereafter, the selection unit 141M adds 1 to x (step S402). Thereafter, the selection unit 141M determines whether or not x is larger than N (step S403).

As a result, in a case where x is not larger than N, the selection unit 141M determines whether or not the map Imap1 (x,y) is taken to be true (step S410). As a result, in a case where the map Imap1 (x,y) is taken to be true, the selection unit 141M writes the interpolated RAW data Iraw2*e* in the interpolated RAW data Iraw4 (x,y) (step S411). In a case where the map Imap1 (x,y) is not taken to be true, the selection unit 141M writes the interpolated RAW data Iraw1*d* (x,y) in the interpolated RAW data Iraw4 (x,y) (step S412). After executing steps S411 and S412, the selection unit 141M returns to step S402.

In step S403, in a case where x is larger than N, the selection unit 141M determines whether or not y is larger than M (step S405). As a result, in a case where y is larger than M, the selection unit 141M ends the creation of the interpolated RAW data Iraw4 (x,y). In a case where y is not larger than M, the selection unit 141M adds 1 to y, while bringing x to 0, and returns to step S402 (step S406). The selection unit 141M repetitively performs steps S402, S403, S405, S406, and S410 to S412 at all the coordinates of the M×N matrix, and thereby creates the interpolated RAW data Iraw4 (x,y).

In this modification example, in a case where the high-frequency component Iraw2*c*_H of the interpolated RAW data Iraw2*c* of the relatively narrow angle of view is larger than the high-frequency component Iraw1*b*_H of the interpolated RAW data Iraw1*b* of the relatively wide angle of view, the composite RAW data Iraw3*a* is generated, by adding together the low-frequency component Iraw1*b*_L of the interpolated RAW data Iraw1*b* and the high-frequency component Iraw2*c*_H of the interpolated RAW data Iraw2*c*. Furthermore, in a case where the high-frequency component Iraw2*c*_H of the interpolated RAW data Iraw2*c* of the relatively narrow angle of view is smaller than the high-frequency component Iraw1*b*_H of the interpolated RAW data Iraw1b of the relatively wide angle of view, the composite RAW data Iraw3a is generated, by adding together the low-frequency component Iraw1b_L of the interpolated RAW data Iraw1b and the high-frequency component Iraw1b_H of the interpolated RAW data Iraw1b. In other words, in this modification example, the high-frequency component Iraw2c_H of the interpolated RAW data Iraw2c is used in the image composition, solely in a case where the blur in the interpolated RAW data Iraw2c is small. Hence, it is possible to avoid the lowered resolution caused by the image composition, in the simple method.

Moreover, in this modification example, the composite RAW data Iraw3a is generated, by adding together the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is larger than the high-frequency component Iraw1b_H of the interpolated RAW data Iraw1b. At this occasion, the high-frequency component Iraw2c_H of the interpolated RAW data Iraw2c is devoid of the blur that influences the composition. Hence, it is possible to obtain the image of the wide visual field and the high resolution.

Moreover, in this modification example, the composite RAW data Iraw3a is generated, by adding together the low-frequency component Iraw1b_L of the interpolated RAW data Iraw1b and the high-frequency component Iraw1b_H of the interpolated RAW data Iraw1b, in each of the pixels in which the high-frequency component Iraw2c_H of the interpolated RAW data Iraw2c is smaller than the high-frequency component Iraw1b_H of the interpolated RAW data Iraw1b. At this occasion, the high-frequency component Iraw1b_H of the interpolated RAW data Iraw1b is devoid of the blur that influences the composition. Hence, it is possible to obtain the image of the wide visual field and the high resolution.

Modification Example B

FIG. 23 illustrates one example in outline of a signal processing procedure in the fusion unit 141 according to this modification example. The fusion unit 141 determines whether or not the high-frequency component Iraw2c_H of the interpolated RAW data Iraw2c of the relatively narrow angle of view is larger than the high-frequency component Iraw1b_H of the interpolated RAW data Iraw1b of the relatively wide angle of view (step S201). As a result, in a case where the high-frequency component Iraw2c_H of the interpolated RAW data Iraw2c is larger than the high-frequency component Iraw1b_H of the interpolated RAW data Iraw1b, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c (step S202). For example, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is larger than the high-frequency component Iraw1b_H of the interpolated RAW data Iraw1b.

In a case where the high-frequency component Iraw2c_H of the interpolated RAW data Iraw2c is equal to the high-frequency component Iraw1b_H of the interpolated RAW data Iraw1b, the fusion unit 141 generates the composite RAW data Iraw3a, by adding together, for example, the low-frequency component Iraw1b_L of the interpolated RAW data Iraw1b and the high-frequency component Iraw2c_H of the interpolated RAW data Iraw2c (step S202). For example, the fusion unit 141 generates the composite RAW data Iraw3a, by adding together, for example, the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is equal to the high-frequency component Iraw1b_H of the interpolated RAW data Iraw1b.

In a case where the high-frequency component Iraw2c_H of the interpolated RAW data Iraw2c is smaller than the high-frequency component Iraw1b_H of the interpolated RAW data Iraw1b, the fusion unit 141 determines presence or absence of an area where changes in pixel value are flat, in the interpolated RAW data Iraw1b (step S205). As a result, in a case with the presence of the area where the changes in the pixel value are flat, in the interpolated RAW data Iraw1b, the fusion unit 141 generates the composite RAW data Iraw3a, by adding together the low-frequency component Iraw1b_L of the interpolated RAW data Iraw1b and the high-frequency component Iraw2c_H of the interpolated RAW data Iraw2c, in an area where, for example, the high-frequency component Iraw2c_H of the interpolated RAW data Iraw2c is smaller than the high-frequency component Iraw1b_H of the interpolated RAW data Iraw1b and the changes in the pixel value are flat (step S202).

In a case with presence of an area where the changes in the pixel value are not flat, in the interpolated RAW data Iraw1b, the fusion unit 141 generates the composite RAW data Iraw3a, by adding together the low-frequency component Iraw1b_L of the interpolated RAW data Iraw1b and the high-frequency component Iraw1b_H of the interpolated RAW data Iraw1b, in an area where, for example, the high-frequency component Iraw2c_H of the interpolated RAW data Iraw2c is smaller than the high-frequency component Iraw1b_H of the interpolated RAW data Iraw1b and the changes in the pixel value are not flat (step S204). For example, the fusion unit 141 generates the composite RAW data Iraw3a, by adding together the low-frequency component Iraw1b_L of the interpolated RAW data Iraw1b and the high-frequency component Iraw1b_H of the interpolated RAW data Iraw1b, in each of pixels in the area where the high-frequency component Iraw2c_H of the interpolated RAW data Iraw2c is smaller than the high-frequency component Iraw1b_H of the interpolated RAW data Iraw1b and where the changes in the pixel value in the interpolated RAW data Iraw1b are not flat.

Now, in the determination as to whether or not the changes in the pixel value in the area are flat, for example, the following dispersion (x,y) is calculated per each pixel. It is to be noted that I (x,y) is a pixel value of the interpolated RAW data Iraw1b at coordinates (x,y). Moreover, Ave is an average value of the pixel values of the interpolated RAW data Iraw1b in a predetermined region (for example, a region of 5×5), with the coordinates (x,y) serving as a center. For example, the fusion unit 141 determines that the coordinates (x,y) is a flat area in a case where the following dispersion (x,y) is smaller than a predetermined threshold, and determines that the coordinates (x,y) is a non-flat area in a case where the following dispersion (x,y) is equal to or larger than the predetermined threshold.

[Expression 1]

$$\text{DISPERSION}(x, y) = \frac{1}{25} \sum_{j=-2}^{2} \sum_{i=-2}^{2} (Ave - I(x+i, y+j))^2 \quad (1)$$

FIG. 24 illustrates one example of an internal configuration of the fusion unit 141 according to this modification example. The fusion unit 141 includes, for example, the LPF unit 141A, the HPF 141B, the parallax correction unit 141C, the blur correction unit 141D, and the superimposition unit 141E. In this modification example, the blur correction unit 141D includes, for example, the HPF unit 141F, the absolute value processing units 141G and 141H, the map creation units 141J and 141K, a map composition unit 141L, and the selection unit 141M.

The map creation unit 141J creates the map Imap1 for a selection of any one from the interpolated RAW data Iraw1$d$ and the interpolated RAW data Iraw2$e$. The map creation unit 141K creates a map Imap2, on the basis of the interpolated RAW data Iraw1$b$. The map composition unit 141L creates a map Imap3, on the basis of the map Imap1 and the map Imap2. The selection unit 141M selects any one from the interpolated RAW data Iraw1$d$ and the interpolated RAW data Iraw2$e$, on the basis of the Imap3, and thereby creates the interpolated RAW data Iraw4.

FIG. 25 illustrates one example of a map creation procedure in the map creation unit 141K. It is to be noted that N in FIG. 25 is an upper limit value of x in the interpolated RAW data Iraw1$b$ (x,y). M in FIG. 25 is an upper limit value of y in the interpolated RAW data Iraw1$b$ (x,y).

The map creation unit 141K creates a map that defines an area where the high-frequency component Iraw1$b$_H of the interpolated RAW data Iraw2$c$ (the interpolated RAW data Iraw2$e$) should be used in the composition, in an area that is taken to be false in the map Imap1. The map creation unit 141K sets x=0 and y=1 in the interpolated RAW data Iraw1$b$ (x,y) (step S501). Thereafter, the map creation unit 141K adds 1 to x (step S502). Thereafter, the map creation unit 141K determines whether or not x is larger than N (step S503). As a result, in a case where x is not larger than N, the map creation unit 141K determines whether or not the x and y coordinates set correspond to the area where the changes in the pixel value are flat (step S504). As a result, in a case where the x and y coordinates set correspond to the flat area, the map creation unit 141K writes true in the map Imap2 (x,y), at the x and y coordinates set (step S505). In a case where the x and y coordinates set do not correspond to the flat area, the map creation unit 141K writes false in the map Imap2 (x,y), at the x and y coordinates set (step S506). After executing steps S505 and S506, the map creation unit 141K returns to step S502.

In step S503, in a case where x is larger than N, the map creation unit 141K determines whether or not y is larger than M (step S507). As a result, in a case where y is larger than M, the map creation unit 141K ends creation of the map Imap2 (x,y). In a case where y is not larger than M, the map creation unit 141K adds 1 to y, while bringing x to 0, and returns to step S402 (step S508). The map creation unit 141K repetitively performs steps S502 to S508 at all the coordinates of the M×N matrix, and thereby creates the map Imap2 (x,y).

FIG. 26 illustrates one example of a map composition procedure in the map composition unit 141L. It is to be noted that N in FIG. 26 is an upper limit value of x in the maps Imap1 (x,y) and Imap2 (x,y). M in FIG. 26 is an upper limit value of y in the maps Imap1 (x,y) and Imap2 (x,y).

The map composition unit 141L creates a map that makes a selection as to whether or not to use, in the composition, the high-frequency component Iraw2$c$_H of the interpolated RAW data Iraw2$c$ (the interpolated RAW data Iraw2$e$). The map composition unit 141L sets x=0 and y=1 in the maps Imap1 (x,y) and the Imap2 (x,y) (step S601). Thereafter, the map composition unit 141L adds 1 to x (step S602). Thereafter, the map composition unit 141L determines whether or not x is larger than N (step S603).

As a result, in a case where x is not larger than N, the map composition unit 141L determines whether or not the map Imap1 (x,y) is taken to be true (step S604). As a result, in a case where the map Imap1 (x,y) is taken to be true, the map composition unit 141L writes true in the map Imap3 (x,y) (step S605). In a case where the map Imap1 (x,y) is not taken to be true, the map composition unit 141L determines whether or not the map Imap2 (x,y) is taken to be true (step S606). As a result, in a case where the map Imap2 (x,y) is taken to be true, the map composition unit 141L writes true in the map Imap3 (x,y) (step S605). In a case where the map Imap2 (x,y) is not taken to be true, the map composition unit 141L writes false in the map Imap3 (x,y) (step S607). After executing steps S605 and S606, the map composition unit 141L returns to step S602.

In step S603, in a case where x is larger than N, the map composition unit 141L determines whether or not y is larger than M (step S608). As a result, in a case where y is larger than M, the map composition unit 141L ends creation of the map Imap3 (x,y). In a case where y is not larger than M, the map composition unit 141L adds 1 to y, while bringing x to 0, and returns to step S602 (step S609). The map composition unit 141L repetitively performs steps S602 to S609 at all the coordinates of the M×N matrix, and thereby creates the map Imap3 (x,y).

FIG. 27 illustrates one example of a selection procedure of fusion target data in the selection unit 141M. It is to be noted that N in FIG. 27 is an upper limit value of x in the map Imap3 (x,y). M in FIG. 27 is an upper limit value of y in the map Imap3 (x,y).

The selection unit 141M generates the interpolated RAW data Iraw4, by selecting, per each pixel, the data to be added to the low-frequency component of the interpolated RAW data Iraw1$b$, from the high-frequency component of the interpolated RAW data Iraw1$b$ (the interpolated RAW data Iraw1$d$) and the high-frequency component of the interpolated RAW data Iraw2$c$ (the interpolated RAW data Iraw2$e$). The selection unit 141M sets x=0 and y=1 in the interpolated RAW data Iraw1$d$ (x,y), the interpolated RAW data Iraw2$e$ (x,y), and the map Imap3 (x,y) (step S701). Thereafter, the selection unit 141M adds 1 to x (step S702). Thereafter, the selection unit 141M determines whether or not x is larger than N (step S703).

As a result, in a case where x is not larger than N, the selection unit 141M determines whether or not the map Imap3 (x,y) is taken to be true (step S704). As a result, in a case where the map Imap3 (x,y) is taken to be true, the selection unit 141M writes the interpolated RAW data Iraw2$e$ in the interpolated RAW data Iraw4 (x,y) (step S705). In a case where the map Imap3 (x,y) is not taken to be true, the selection unit 141M writes the interpolated RAW data Iraw1$d$ (x,y) in the interpolated RAW data Iraw4 (x,y) (step S706). After executing steps S705 and S706, the selection unit 141M returns to step S702.

In step S703, in a case where x is larger than N, the selection unit 141M determines whether or not y is larger than M (step S707). As a result, in a case where y is larger than M, the selection unit 141M ends creation of the interpolated RAW data Iraw4 (x,y). In a case where y is not larger than M, the selection unit 141M adds 1 to y, while bringing x to 0, and returns to step S702 (step S708). The selection unit 141M repetitively performs steps S702 to S708 at all the coordinates of the M×N matrix, and thereby creates the interpolated RAW data Iraw4 (x,y).

In this modification example, in a case where the high-frequency component Iraw2c_H of the interpolated RAW data Iraw2c of the relatively narrow angle of view is larger than the high-frequency component Iraw1b_H of the interpolated RAW data Iraw1b of the relatively wide angle of view, the composite RAW data Iraw3a is generated, by adding together the low-frequency component Iraw1b_L of the interpolated RAW data Iraw1b and the high-frequency component Iraw2c_H of the interpolated RAW data Iraw2c. Furthermore, in a case where the high-frequency component Iraw2c_H of the interpolated RAW data Iraw2c of the relatively narrow angle of view is smaller than the high-frequency component Iraw1b_H of the interpolated RAW data Iraw1b of the relatively wide angle of view, the composite RAW data Iraw3a is generated, by adding together the low-frequency component Iraw1b_L of the interpolated RAW data Iraw1b and the high-frequency component Iraw1b_H of the interpolated RAW data Iraw1b. In other words, in this modification example, the high-frequency component Iraw2c_H of the interpolated RAW data Iraw2c is used in the image composition, solely in a case where the blur in the interpolated RAW data Iraw2c is small. Hence, it is possible to avoid the lowered resolution caused by the image composition, in the simple method.

Moreover, in this modification example, the composite RAW data Iraw3a is generated, by adding together the low-frequency component Iraw1b_L of the interpolated RAW data Iraw1b and the high-frequency component Iraw2c_H of the interpolated RAW data Iraw2c, in each of the pixels in which the high-frequency component Iraw2c_H of the interpolated RAW data Iraw2c is larger than the high-frequency component Iraw1b_H of the interpolated RAW data Iraw1b. At this occasion, the high-frequency component Iraw2c_H of the interpolated RAW data Iraw2c is devoid of the blur that influences the composition. Hence, it is possible to obtain the image of the wide visual field and the high resolution.

Moreover, in this modification example, the composite RAW data Iraw3a is generated, by adding together the low-frequency Iraw1b_L of the interpolated RAW data Iraw1b and the high-frequency Iraw1b_H of the interpolated RAW data Iraw1b, in each of the pixels in which the high-frequency component Iraw2c_H of the interpolated RAW data Iraw2c is smaller than the high-frequency component Iraw1b_H of the interpolated RAW data Iraw1b. At this occasion, the high-frequency component Iraw1b_H of the interpolated RAW data Iraw1b is devoid of the blur that influences the composition. Hence, it is possible to obtain the image of the wide visual field and the high resolution.

Moreover, in this modification example, the composite RAW data Iraw3a is generated, by adding together the low-frequency component Iraw1b_L of the interpolated RAW data Iraw1b and the high-frequency component Iraw2c_H of the interpolated RAW data Iraw2c, in each of pixels included in the area where the changes in the pixel value are flat, out of the pixels in which the high-frequency component Iraw1b_H of the interpolated RAW data Iraw1b is larger than the high-frequency component Iraw2c_H of the interpolated RAW data Iraw2c. Hence, it is possible to obtain the image of the wide visual field and the high resolution.

3. Second Embodiment

[Configuration]

Description is given next of an imaging apparatus 2 according to a second embodiment of the disclosure. FIG. 28 illustrates functional blocks of the imaging apparatus 2. The imaging apparatus 2 obtains the image of the wide angle of view and the high resolution, and/or performs the optical zooming without using the mechanical zooming mechanism, with the use of the two imaging devices 10 and 20. The imaging apparatus 2 includes, for example, the two imaging devices 10 and 20, the signal processing unit 30, and the control unit 40. In this embodiment, the signal processing unit 30 includes two camera signal processing units 33 and 34, and a single composition processing unit 35. The composition processing unit 33 performs the demosaic processing on the RAW data Iraw1 generated by the imaging device 10, and thereby generates color image data Icol1. The composition processing unit 34 performs the demosaic processing on the RAW data Iraw2 generated by the imaging device 20, and thereby generates color image data Icol2. The composition processing unit 35 performs composition of the two pieces of the color image data Icol1 and Icol2 generated by the two composition processing units 33 and 34, with each other, and thereby generates color image data Icol.

FIG. 29 illustrates one example of functional blocks of the composition processing unit 35.

The composition processing unit 35 includes an alignment unit 150 and a composition unit 160. The alignment unit 150 generates alignment data of the two pieces of the color image data Icol1 and Icol2, on the basis of the two pieces of the color image data Icol1 and Icol2. The composition unit 160 performs the composition of the two pieces of the color image data Icol1 and Icol2 with each other, on the basis of the alignment data generated by the alignment unit 150.

The alignment unit 150 includes, for example, a segmentation unit 151, a gain correction unit 152, luminance calculation units 153 and 154, a reduction unit 155, and a parallax calculation unit 156.

The segmentation unit 151 specifies the fusion region β (corresponding to the region α in FIG. 5) in the color image data Icol1. The fusion region β is a region to be subjected to the composition with the color image data Icol2. Specifically, the segmentation unit 151 specifies the fusion region β, on the basis of the magnification of the imaging devices 10 and 20, and on the basis of image sizes of the color image data Icol1 and Icol2. For example, the segmentation unit 151 specifies coordinates of the fusion region β in the color image data Icol1, on the basis of the magnification of the imaging devices 10 and 20, and on the basis of the image sizes of the color image data Icol1 and Icol2. For example, on the basis of the coordinates specified, the segmentation unit 151 segments, from the color image data Icol1, color image data Icol1a corresponding to the fusion region β.

The gain correction unit 152 calculates a gain ratio (for example, an RGB gain ratio) per each color information in the color image data Icol1a and Icol2. For example, the gain correction unit 152 calculates, per each color information, an average value in the color image data Icol1a, and calculates, per each color information, an average value in the color image data Icol2. For example, the gain correction unit 152 calculates, per each color information, a correction gain from a ratio of the average values per each color information, in the color image data Icol1a and Icol2. On the basis of the correction gain calculated, the gain correction unit 152 corrects the color image data Icol2, and thereby generates the color image data Icol2a.

The luminance calculation unit 153 calculates luminance data of each pixel in the color image data Icol1a, on the basis of each color information included in the color image data Icol1a. Thus, the luminance calculation unit 153 obtains luminance data Icol1b having the luminance data per each pixel. The luminance calculation unit 154 calculates luminance data of each pixel in the color image data Icol2a, on the basis of each color information included in the color image data Icol2a. Thus, the luminance calculation unit 154 obtains luminance data Icol2b having the luminance data per each pixel.

The reduction unit 155 reduces the color image data Icol2a and the luminance data Icol2b, on the basis of the magnification of the imaging devices 10 and 20. Thus, the reduction unit 155 obtains color image data Icol2c and luminance data Icol2d. The parallax calculation unit 156 calculates the parallax information Disp as the alignment data, on the basis of the luminance data Icol1b and Icol2d. For example, the parallax calculation unit 156 generates the parallax information Disp from the luminance data Icol1b and Icol2d, with the use of, for example, the motion vector estimation method between two images.

The composition unit 160 includes, for example, a fusion unit 161, an LPF unit 162, a merge unit 163, and a selection unit 164.

The fusion unit 161 generates color image data Icol3a, by performing composition of the two pieces of the color image data Icol1a and Icol2c. Specifically, the fusion unit 161 generates the color image data Icol3a, by performing the composition of the two pieces of the color image data Icol1a and Icol2c, on the basis of the parallax information Disp.

In this embodiment, signal processing in the fusion unit 161 is substantially equal to the signal processing in the fusion unit 141 according to the forgoing embodiment.

FIG. 30 illustrates one example in outline of a signal processing procedure in the fusion unit 161. The fusion unit 161 determines whether or not a high-frequency component Icol2c_H of the color image data Icol2c of a relatively narrow angle of view is larger than a high-frequency component Icol1a_H of the color image data Icol1a of a relatively wide angle of view (step S801). As a result, in a case where the high-frequency component Icol2c_H of the color image data Icol2c is larger than the high-frequency component Icol1a_H of the color image data Icol1a, the fusion unit 161 generates the color image data Icol3a (second composite imaging data), by adding together a low-frequency component Icol1a_L of the color image data Icol1a and the high-frequency component Icol2c_H of the color image data Icol2c (step S802). The fusion unit 161 generates the color image data Icol3a, by adding together the low-frequency component Icol1a_L of the color image data Icol1a and the high-frequency component Icol2c_H of the color image data Icol2a, in each of the pixels in which the high-frequency component Icol2c_H of the color image data Icol2c is larger than the high-frequency component Icol1a_H of the color image data Icol1a.

In a case where the high-frequency component Icol2c_H of the color image data Icol2c is equal to the high-frequency component Icol1a_H of the color image data Icol1a, the fusion unit 161 generates the color image data Icol3a, by adding together, for example, the low-frequency component Icol1a_L of the color image data Icol1a and the high-frequency component Icol2c_H of the color image data Icol2c (step S802). The fusion unit 161 generates the color image data Icol3a, by adding together, for example, the low-frequency component Icol1a_L of the color image data Icol1a and the high-frequency component Icol2c_H of the color image data Icol2c, in each of the pixels in which the high-frequency component Icol2c_H of the color image data Icol2c is equal to the high-frequency component Icol1a_H of the color image data Icol1a.

In a case where the high-frequency component Icol2c_H of the color image data Icol2c is smaller than the high-frequency component Icol1a_H of the color image data Icol1a, the fusion unit 161 generates the color image data Icol3a (first composite image data), by adding together the low-frequency component Icol1a_L of the color image data Icol1a, the high-frequency component Icol1a_H of the color image data Icol1a, and the high-frequency component Icol2c_H of the color image data Icol2c (step S803). The fusion unit 161 generates the color image data Icol3a, by adding together the low-frequency component Icol1a_L of the color image data Icol1a, the high-frequency component Icol1a_H of the color image data Icol1a, and the high-frequency component Icol2c_H of the color image data Icol2c, in each of the pixels in which the high-frequency component Icol2c_H of the color image data Icol2c is smaller than the high-frequency component Icol1a_H of the color image data Icol1a.

[Effects]

Described next are effects of the imaging apparatus 2.

In this embodiment, the color image data Icol3a is generated, by adding together the low-frequency component Icol1a_L of the color image data Icol1a of the relatively wide angle of view and the high-frequency component Icol2c_H of the relatively narrow angle of view. Thus, with the color image data Icol1a including a blur, it is possible to alleviate influences of the blur, as compared to a case where in the color image data Icol1a of the relatively wide angle of view, the high-frequency component is replaced with the high-frequency component of the color image data Icol2c of the relatively narrow angle of view. Hence, it is possible to avoid the lowered resolution caused by the image composition, in the simple method.

Moreover, in this embodiment, the color image data Icol3a is generated, by adding together the low-frequency component Icol1a_L of the color image data Icol1a and the high-frequency component Icol2c_H of the color image data Icol2c, in each of the pixels in which the high-frequency component Icol2c_H of the color image data Icol2c is larger than the high-frequency component Icol1a_H of the color image data Icol1a. At this occasion, the high-frequency component Icol2c_H of the color image data Icol2c is devoid of the blur that influences the composition. Hence, it is possible to obtain the image of the wide visual field and the high resolution.

Moreover, in this embodiment, the color image data Icol3a is generated, by adding together the low-frequency component Icol1a_L of the color image data Icol1a, the high-frequency component Icol1a_H of the color image data Icol1a, and the high-frequency component Icol2c_H of the color image data Icol2c, in each of the pixels in which the high-frequency component Icol2c_H of the color image data Icol2c is smaller than the high-frequency component Icol1a_H of the color image data Icol1a. At this occasion, it is estimated that the high-frequency component Icol2c_H of the color image data Icol2c includes the blur that influences the composition. However, the high-frequency component Icol1a_H of the color image data Icol1a is also used in the composition. This makes it possible to reduce the influences by the blur the presence of which in the high-frequency component Icol2c_H of the color image data Icol2c is estimated. Hence, it is possible to avoid the lowered resolution caused by the image composition, in the simple method.

Moreover, in this embodiment, the region other than the outer edge, out of the imaging region R1 of the imaging device 10, serves as the imaging region R2 of the imaging device 20. Furthermore, in this embodiment, the color image data Icol1 and the color image data Icol2 are generated by the imaging devices 10 and 20, and the camera signal processing units 33 and 34. The color image data Icol1 has the relatively wide angle of view. The color image data Icol2 has the narrower angle of view than that of the color image data Icol1. Thus, performed is the composition of the predetermined region (the fusion region β) other than the outer edge out of the color image data Icol1, and the color image data Icol2 with each other. In other words, the color image data Icol2 is fitted into the frame-like color image data Icol1. As a result, with the use of the two imaging devices 10 and 20, and with the use of the camera signal processing units 33 and 34, it is possible to obtain the image of the wide visual field and the high resolution, and/or to perform the optical zooming without using the mechanical zooming mechanism.

4. Modification Examples of Second Embodiment

Description is given next of modification examples of the imaging apparatus 2 according to the forgoing second embodiment. The signal processing in the fusion unit 161 in the following modification examples C and D is substantially equal to the signal processing in the fusion unit 141 according to the modification examples A and B of the forgoing first embodiment.

Modification Example C

FIG. 31 illustrates one example in outline of a signal processing procedure in the fusion unit 161 according to this modification example. The fusion unit 161 determines whether or not the high-frequency component Icol2c_H of the color image data Icol2c of the relatively narrow angle of view is larger than the high-frequency component Icol1a_H of the color image data Icol1a of the relatively wide angle of view (step S801). As a result, in a case where the high-frequency component Icol2c_H of the color image data Icol2c is larger than the high-frequency component Icol1a_H of the color image data Icol1a, the fusion unit 161 generates the color image data Icol3a, by adding together the low-frequency component Icol1a_L of the color image data Icol1a and the high-frequency component Icol2c_H of the color image data Icol2c (step S802). The fusion unit 161 generates the color image data Icol3a, by adding together the low-frequency component Icol1a_L of the color image data Icol1a and the high-frequency component Icol2c_H of the color image data Icol2c, in each of the pixels in which the high-frequency component Icol2c_H of the color image data Icol2c is larger than the high-frequency component Icol1a_H of the color image data Icol1a.

In a case where the high-frequency component Icol2c_H of the color image data Icol2c is equal to the high-frequency component Icol1a_H of the color image data Icol1a, the fusion unit 161 generates the color image data Icol3a, by adding together, for example, the low-frequency component Icol1a_L of the color image data Icol1a and the high-frequency component Icol2c_H of the color image data Icol2c (step S802). The fusion unit 161 generates the color image data Icol3a, by adding together, for example, the low-frequency component Icol1a_L of the color image data Icol1a and the high-frequency component Icol2c_H of the color image data Icol2c, in each of the pixels in which the high-frequency component Icol2c_H of the color image data Icol2c is equal to the high-frequency component Icol1a_H of the color image data Icol1a.

In a case where the high-frequency component Icol2c_H of the color image data Icol2c is smaller than the high-frequency component Icol1a_H of the color image data Icol1a, the fusion unit 161 generates the color image data Icol3a, by adding together the low-frequency component Icol1a_L of the color image data Icol1a and the high-frequency component Icol1a_H of the color image data Icol1a (step S804). The fusion unit 161 generates the color image data Icol3a, by adding together the low-frequency component Icol1a_L of the color image data Icol1a and the high-frequency component Icol1a_H of the color image data Icol1a, in each of the pixels in which the high-frequency component Icol2c_H of the color image data Icol2c is smaller than the high-frequency component Icol1a_H of the color image data Icol1a.

In this modification example, in a case where the high-frequency component Icol2c_H of the color image data Icol2c of the relatively narrow angle of view is larger than the high-frequency component Icol1a_H of the color image data Icol1a of the relatively wide angle of view, the color image data Icol3a is generated, by adding together the low-frequency component Icol1a_L of the color image data Icol1a and the high-frequency component Icol2c_H of the color image data Icol2c. Furthermore, in a case where the high-frequency component Icol2c_H of the color image data Icol2c is smaller than the high-frequency component Icol1a_H of the color image data Icol1a, the color image data Icol3a is generated, by adding together the low-frequency component Icol1a_L of the color image data Icol1a and the high-frequency component Icol1a_H of the color image data Icol1a. In other words, in this modification example, the high-frequency component Icol2c_H of the color image data Icol2c is used in the image composition, solely in a case where the blur in the color image data Icol2c is small. Hence, it is possible to avoid the lowered resolution caused by the image composition, in the simple method.

Moreover, in this modification example, the color image data Icol3a is generated, by adding together the low-frequency component Icol1a_L of the color image data Icol1a and the high-frequency component Icol2c_H of the color image data Icol2c, in each of the pixels in which the high-frequency component Icol2c_H of the color image data Icol2c is larger than the high-frequency component Icol1a_H of the color image data Icol1a. At this occasion, the high-frequency component Icol2c_H of the color image data Icol2c is devoid of the blur that influences the composition. Hence, it is possible to obtain the image of the wide visual field and the high resolution.

Moreover, in this modification example, the composite RAW data Iraw3a is generated, by adding together the low-frequency component Icol1a_L of the color image data Icol1a and the high-frequency component Icol1a_H of the color image data Icol1a, in each of the pixels in which the high-frequency component Icol2c_H of the color image data Icol2c is smaller than the high-frequency component Icol1a_H of the color image data Icol1a. At this occasion, the high-frequency component Icol1a_H of the color image data Icol1a is devoid of the blur that influences the composition. Hence, it is possible to obtain the image of the wide visual field and the high resolution.

Modification Example D

FIG. 32 illustrates one example in outline of a signal processing procedure in the fusion unit 161 according to this modification example. The fusion unit 161 determines whether or not the high-frequency component Icol2c_H of the color image data Icol2c of the relatively narrow angle of view is larger than the high-frequency component Icol1a_H of the color image data Icol1a of the relatively wide angle of view (step S801). As a result, in a case where the high-frequency component Icol2c_H of the color image data Icol2c is larger than the high-frequency component Icol1a_H of the color image data Icol1a, the fusion unit 161 generates the color image data Icol3a, by adding together the low-frequency component Icol1a_L of the color image data Icol1a and the high-frequency component Icol2c_H of the color image data Icol2c (step S802). The fusion unit 161 generates the color image data Icol3a, by adding together the low-frequency component Icol1a_L of the color image data Icol1a and the high-frequency component Icol2c_H of the color image data Icol2a, in each of the pixels in which the high-frequency component Icol2c_H of the color image data Icol2c is larger than the high-frequency component Icol1a_H of the color image data Icol1a.

In a case where the high-frequency component Icol2c_H of the color image data Icol2c is equal to the high-frequency component Icol1a_H of the color image data Icol1a, the fusion unit 161 generates the color image data Icol3a, by adding together, for example, the low-frequency component Icol1a_L of the color image data Icol1a and the high-frequency component Icol2c_H of the color image data Icol2c (step S802). The fusion unit 161 generates the color image data Icol3a, by adding together, for example, the low-frequency component Icol1a_L of the color image data Icol1a and the high-frequency component Icol2c_H of the color image data Icol2c, in each of the pixels in which the high-frequency component Icol2c_H of the color image data Icol2c is equal to the high-frequency component Icol1a_H of the color image data Icol1a.

In a case where the high-frequency component Icol2c_H of the color image data Icol2c is smaller than the high-frequency component Icol1a_H of the color image data Icol1a, the fusion unit 161 determines the presence or the absence of the area where the changes in the pixel value are flat, in the color image data Icol1a (step S805). As a result, in a case with the presence of the flat area in the color image data Icol1a, the fusion unit 161 generates the color image data Icol3a, by adding together the low-frequency component Icol1a_L of the color image data Icol1a and the high-frequency component Icol2c_H of the color image data Icol2c, for example, in the flat area in the color image data Icol1a in which the high-frequency component Icol2c_H of the color image data Icol2c is smaller than the high-frequency component Icol1a_H of the color image data Icol1a (step S802).

In a case with the presence of the area where the changes in the pixel value are not flat, in the color image data Icol1a, the fusion unit 161 generates the color image data Icol3a, by adding together the low-frequency component Icol1a_L of the color image data Icol1a and the high-frequency component Icol1a_H of the color image data Icol1a, in the area where the changes in the pixel value are not flat, in the color image data Icol1a and in which the high-frequency component Icol2c_H of the color image data Icol2c is smaller than the high-frequency component Icol1a_H of the color image data Icol1a (step S804). For example, the fusion unit 161 generates the color image data Icol3a, by adding together the low-frequency component Icol1a_L of the color image data Icol1a and the high-frequency component Icol1a_H of the color image data Icol1a, in each of pixels in the area where the changes in the pixel value are not flat in the color image data Icol1a and where the high-frequency component Icol2c_H of the color image data Icol2c is smaller than the high-frequency component Icol1a_H of the color image data Icol1a.

Now, in the determination as to whether or not the changes in the pixel value in the area are flat, for example, the dispersion (x,y) as mentioned above is calculated per each pixel. It is to be noted that I (x,y) is a pixel value of the color image data Icol1a at coordinates (x,y). Moreover, Ave is an average value of the pixel values of the color image data Icol1a in a predetermined region (for example, a region of 5×5), with the coordinates (x,y) serving as a center. For example, the fusion unit 161 determines that the coordinates (x,y) is the area where the changes in the pixel value are flat, in a case where the dispersion (x,y) as mentioned above is smaller than a predetermined threshold, and determines that the coordinates (x,y) are the area where the changes in the pixel value are not flat, in a case where the dispersion (x,y) as follows is equal to or larger than the predetermined threshold.

In this modification example, in a case where the high-frequency component Icol2c_H of the color image data Icol2c of the relatively narrow angle of view is larger than the high-frequency component Icol1a_H of the color image data Icol1a of the relatively wide angle of view, the color image data Icol3a is generated, by adding together the low-frequency component Icol1a_L of the color image data Icol1a and the high-frequency component Icol2c_H of the color image data Icol2c. Furthermore, in a case where the high-frequency component Icol2c_H of the color image data Icol2c is smaller than the high-frequency component Icol1a_H of the color image data Icol1a, the color image data Icol3a is generated, by adding together the low-frequency component Icol1a_L of the color image data Icol1a and the high-frequency component Icol1a_H of the color image data Icol1a. In other words, in this modification example, the high-frequency component Icol2c_H of the color image data Icol2c is used in the image composition, solely in a case where the blur in the color image data Icol2c is small. Hence, it is possible to avoid the lowered resolution caused by the image composition, in the simple method.

Moreover, in this modification example, the color image data Icol3a is generated, by adding together the low-frequency component Icola_L of the color image data Icol1a and the high-frequency component Icol2c_H of the color image data Icol2c, in each of the pixels in which the high-frequency component Icol2c_H of the color image data Icol2c is larger than the high-frequency component Icol1a_H of the color image data Icol1a. At this occasion, the high-frequency component Icol2c_H of the color image data Icol2c is devoid of the blur that influences the composition. Hence, it is possible to obtain the image of the wide visual field and the high resolution.

Moreover, in this modification example, the composite RAW data Iraw3a is generated, by adding together the low-frequency component Icol1a_L of the color image data Icol1a and the high-frequency component Icol1a_H of the color image data Icol1a, in each of the pixels in which the high-frequency component Icol2c_H of the color image data Icol2c is smaller than the high-frequency component Icol1$a$_H of the color image data Icol1$a$. At this occasion, the high-frequency component Icol1$a$_H of the color image data Icol1$a$ is devoid of the blur that influences the composition. Hence, it is possible to obtain the image of the wide visual field and the high resolution.

Moreover, in this modification example, the color image data Icol3$a$ is generated, by adding together the low-frequency component Icol1$a$_L of the color image data Icol1$a$ and the high-frequency component Icol2$c$_H of the color image data Icol2$c$, in each of pixels included in the area where the changes in the pixel value are flat, out of the pixels in which the high-frequency component Icol2$c$_H of the color image data Icol2$c$ is larger than the high-frequency component Icol1$a$_H of the color image data Icol1$a$. Hence, it is possible to obtain the image of the wide visual field and the high resolution.

5. Common Modification Examples

Description is given next of modification examples common to the imaging apparatuses 1 and 2 according to the forgoing embodiments and their modification examples.

In the forgoing embodiments and their modification examples, the imaging apparatuses 1 and 2 include the two imaging devices 10 and 20. However, the imaging apparatuses 1 and 2 may include three or more imaging devices. For example, the three or more imaging devices are so disposed as to allow their physical disposition to be horizontal with one another. Optical axes of the respective imaging devices 10 are non-parallel to one another. At this occasion, it is preferable that the optical axes of the respective imaging devices 10 be directed in a direction in which each of clearances between the optical axes of the respective imaging devices 10 narrows as is father away from the imaging apparatuses 1 and 2. The optical axes of the respective imaging devices 10 may be parallel to one another.

Although description has been made by giving the embodiments and their modification examples as mentioned above, the contents of the disclosure are not limited to the above-mentioned example embodiments and may be modified in a variety of ways. It is to be noted that effects described herein are merely exemplified. Effects of the disclosure are not limited to the effects described herein. Effects of the disclosure may further include other effects than the effects described herein.

6. Application Example to Mobile Body

Technology related to the disclosure (the technology) may be applied to various products. For example, the technology related to the disclosure may be achieved as an apparatus to be mounted on any kind of mobile bodies, e.g., an automobile, an electric automobile, a hybrid electric automobile, a motorcycle, a bicycle, personal mobility, an aircraft, a drone, a vessel, and a robot.

FIG. 33 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 33, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 33, an audio speaker 12061, a display section 12062, and an instrument panel 12063 are illustrated as the output device. The display section 12062 may, for example, include at least one of an on-board display and a head-up display.

FIG. 34 is a diagram depicting an example of the installation position of the imaging section 12031.

In FIG. 34, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 34 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in uniticular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the forgoing, described is one example of the vehicle control system to which the technology related to the disclosure may be applied. The technology related to the disclosure may be applied to the imaging unit 12031 out of the configurations as described above. Applying the technology related to the disclosure to the imaging unit 12031 makes it possible to obtain a composite image of high resolution.

Moreover, for example, the disclosure may have the following configuration.

(1)

An imaging apparatus, including:

two imaging devices that generate respective pieces of imaging data that differ in angle of view from each other; and a composition unit that generates first composite imaging data, by adding together a low-frequency component of first imaging data, a high-frequency component of the first imaging data, and a high-frequency component of second imaging data, the first imaging data being the imaging data that has been generated by one of the imaging devices and has a relatively wide angle of view, and the second imaging data being the imaging data that has been generated by another of the imaging devices and has a relatively narrow angle of view.

(2)

The imaging apparatus according to (1), in which the composition unit generates the first composite imaging data, on a condition that the high-frequency component of the second imaging data is smaller than the high-frequency component of the first imaging data.

(3)

The imaging apparatus according to (2), in which the composition unit generates the first composite imaging data, by adding together the low-frequency component of the first imaging data, the high-frequency component of the first imaging data, and the high-frequency component of the second imaging data, in each of pixels in which the high-frequency component of the second imaging data is smaller than the high-frequency component of the first imaging data.

(4)

The imaging apparatus according to (2) or (3), in which the composition unit generates second composite imaging data, by adding together the low-frequency component of the first imaging data and the high-frequency component of the second imaging data, on a condition that the high-frequency component of the second imaging data is larger than the high-frequency component of the first imaging data.

(5)

The imaging apparatus according to (4), in which the composition unit generates the second composite imaging data, by adding together the low-frequency component of the first imaging data and the high-frequency component of the second imaging data, in each of pixels in which the high-frequency component of the second imaging data is larger than the high-frequency component of the first imaging data.

(6)

The imaging apparatus according to any one of (1) to (5), in which each piece of the imaging data is RAW data in which a single piece of color information is set per each pixel.

(7)

The imaging apparatus according to any one of (1) to (5), in which each piece of the imaging data is color image data in which a plurality of kinds of color information are set per each pixel.

(8)

The imaging apparatus according to any one of (1) to (7), in which a first imaging device generates the first imaging data by imaging, the first imaging device being one of the two imaging devices, and a second imaging device generates the second imaging data by imaging, the second imaging device being another of the two imaging devices and taking charge of, as an imaging region, a region other than an outer edge out of an imaging region of the first imaging device.

(9)

The imaging apparatus according to (8), in which the composition unit generates the first composite imaging data, by adding together a predetermined region other than an outer edge out of the first imaging data, and the high-frequency component of the second imaging data.

(10)

An imaging apparatus, including:

two imaging devices that generate respective pieces of imaging data that differ in angle of view from each other; and a composition unit that generates first composite imaging data, on a condition that a high-frequency component of first imaging data is larger than a high-frequency component of second imaging data, by adding together a low-frequency component of the first imaging data and the high-frequency component of the second imaging data, the first imaging data being the imaging data that has been generated by one of the imaging devices and has a relatively wide angle of view, and the second imaging data being the imaging data that has been generated by another of the imaging devices and has a relatively narrow angle of view, and generates second composite imaging data, on a condition that the high-frequency component of the first imaging data is smaller than the high-frequency component of the second imaging data, by adding together the low-frequency component of the first imaging data and the high-frequency component of the first imaging data.

(11)

The imaging apparatus according to (10), in which the composition unit generates the first composite imaging data, by adding together the low-frequency component of the first imaging data and the high-frequency component of the second imaging data, in each of pixels in which the high-frequency component of the first imaging data is larger than the high-frequency component of the second imaging data, and generates the second composite imaging data, by adding together the low-frequency component of the first imaging data and the high-frequency component of the first imaging data, in each of pixels in which the high-frequency component of the first imaging data is smaller than the high-frequency component of the second imaging data.

(12)

The imaging apparatus according to (11), in which the composition unit generates the first composite imaging data, by adding together the low-frequency component of the first imaging data and the high-frequency component of the second imaging data, in each of pixels included in an area where changes in pixel value are flat, out of the pixels in which the high-frequency component of the second imaging data is smaller the high-frequency component of the first imaging data.

(13)

The imaging apparatus according to any one of (10) to (12), in which each piece of the imaging data is RAW data in which a single piece of color information is set per each pixel.

(14)

The imaging apparatus according to any one of (10) to (12), in which each piece of the imaging data is color image data in which a plurality of kinds of color information are set per each pixel.

(15)

The imaging apparatus according to any one of (10) to (14), in which a first imaging device generates the first imaging data by imaging, the first imaging device being one of the two imaging devices, and a second imaging device generates the second imaging data by imaging, the second imaging device being another of the two imaging devices and taking charge of, as an imaging region, a region other than an outer edge out of an imaging region of the first imaging device.

(16)

The imaging apparatus according to (15), in which the composition unit generates the first composite imaging data, by adding together a predetermined region other than an outer edge out of the first imaging data, and the high-frequency component of the second imaging data.

(17)

A signal processing apparatus, including a composition unit that generates first composite imaging data, by adding together a low-frequency component of first imaging data, a high-frequency component of the first imaging data, and a high-frequency component of second imaging data, the first imaging data being imaging data of a relatively wide angle of view, out of two pieces of imaging data that differ in angle of view from each other, and the second imaging data being the imaging data of a relatively narrow angle of view, out of the two pieces of the imaging data.

(18)

A signal processing apparatus, including a composition unit that generates first composite imaging data, on a condition that a high-frequency component of first imaging data is larger than a high-frequency component of second imaging data, by adding together a low-frequency component of the first imaging data and the high-frequency component of the second imaging data, the first imaging data being imaging data of a relatively wide angle of view, out of two pieces of imaging data that differ in angle of view from each other, and the second imaging data being imaging data of a relatively narrow angle of view, out of the two pieces of the imaging data, and generates second composite imaging data, on a condition that the high-frequency component of the first imaging data is smaller than the high-frequency component of the second imaging data, by adding together the low-frequency component of the first imaging data and the high-frequency component of the first imaging data.

This application claims the benefit of Japanese Priority Patent Application JP2016-080132 filed on Apr. 13, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus, comprising:
two imaging devices that generate respective pieces of imaging data that differ in angle of view from each other; and
a composition unit that generates first composite imaging data, by adding together a low-frequency component of first imaging data, a high-frequency component of the first imaging data, and a high-frequency component of second imaging data, the first imaging data being the imaging data that has been generated by one of the imaging devices and has a relatively wide angle of view, and the second imaging data being the imaging data that has been generated by another of the imaging devices and has a relatively narrow angle of view.

2. The imaging apparatus according to claim 1, wherein the composition unit generates the first composite imaging data, on a condition that the high-frequency component of the second imaging data is smaller than the high-frequency component of the first imaging data.

3. The imaging apparatus according to claim 2, wherein the composition unit generates the first composite imaging data, by adding together the low-frequency component of the first imaging data, the high-frequency component of the first imaging data, and the high-frequency component of the second imaging data, in each of pixels in which the high-frequency component of the second imaging data is smaller than the high-frequency component of the first imaging data.

4. The imaging apparatus according to claim 2, wherein the composition unit generates second composite imaging data, by adding together the low-frequency component of the first imaging data and the high-frequency component of the second imaging data, on a condition that the high-frequency component of the second imaging data is larger than the high-frequency component of the first imaging data.

5. The imaging apparatus according to claim 4, wherein the composition unit generates the second composite imaging data, by adding together the low-frequency component of the first imaging data and the high-frequency component of the second imaging data, in each of pixels in which the high-frequency component of the second imaging data is larger than the high-frequency component of the first imaging data.

6. The imaging apparatus according to claim 1, wherein each piece of the imaging data is RAW data in which a single piece of color information is set per each pixel.

7. The imaging apparatus according to claim 1, wherein each piece of the imaging data is color image data in which a plurality of kinds of color information are set per each pixel.

8. The imaging apparatus according to claim 1, wherein a first imaging device generates the first imaging data by imaging, the first imaging device being one of the two imaging devices, and
a second imaging device generates the second imaging data by imaging, the second imaging device being another of the two imaging devices and taking charge of, as an imaging region, a region other than an outer edge out of an imaging region of the first imaging device.

9. The imaging apparatus according to claim 8, wherein the composition unit generates the first composite imaging data, by adding together a predetermined region other than an outer edge out of the first imaging data, and the high-frequency component of the second imaging data.

10. A signal processing apparatus, comprising
a composition unit that generates first composite imaging data, by adding together a low-frequency component of first imaging data, a high-frequency component of the first imaging data, and a high-frequency component of second imaging data, the first imaging data being imaging data of a relatively wide angle of view, out of two pieces of imaging data that differ in angle of view from each other, and the second imaging data being the imaging data of a relatively narrow angle of view, out of the two pieces of the imaging data.

* * * * *